United States Patent [19]

Jacob et al.

[11] Patent Number: 5,069,068

[45] Date of Patent: Dec. 3, 1991

[54] FLUID LEVEL MAINTENANCE SENSOR FOR USE IN A TANK TEST SYSTEM

[75] Inventors: Allan S. Jacob, Rochester Hills; Andrzej Zawadzki, Birmingham, both of Mich.

[73] Assignee: Heath Consultants Incorporated, Stoughton, Mass.

[21] Appl. No.: 534,972

[22] Filed: Jun. 8, 1990

Related U.S. Application Data

[62] Division of Ser. No. 174,762, Mar. 29, 1988, Pat. No. 4,954,973.

[51] Int. Cl.⁵ .................... G01F 23/56; G01F 23/62
[52] U.S. Cl. ........................... 73/313; 73/309; 73/314; 340/624
[58] Field of Search .............. 73/309, 313, 314, 319, 73/322.5, 308; 200/84; 340/624; 361/284; 324/208, 207.24, 207.16, 207.15

[56] References Cited

U.S. PATENT DOCUMENTS

| | | | |
|---|---|---|---|
| 2,903,678 | 9/1959 | Wills | 73/313 X |
| 3,331,245 | 7/1967 | Barker | 73/313 |
| 3,638,492 | 2/1972 | Fling et al. | 73/314 X |
| 4,305,283 | 12/1981 | Redding | 324/207.24 X |
| 4,954,973 | 9/1990 | Jacob et al. | 73/313 X |

FOREIGN PATENT DOCUMENTS

| | | | |
|---|---|---|---|
| 2353171 | 10/1973 | Fed. Rep. of Germany | 73/313 |
| 407909 | 1/1910 | France | 73/313 |
| 0163626 | 6/1989 | Japan | 73/313 |

Primary Examiner—Stuart S. Levy
Assistant Examiner—Joseph A. Rhoa
Attorney, Agent, or Firm—Robert G. Mentag

[57] ABSTRACT

A fluid level maintenance sensor or use in a tank test system and which includes an upper sensor coil and a lower sensor coil mounted on a level sensing tube. A float carrying a ferromagnetic ring is operatively mounted in the level sensing tube which causes a fluid transfer signal to be generated when the float and ring are moved upwardly or downwardly to transfer fluid out or into the level sensing tube to maintain a selected fluid level in the tube.

2 Claims, 20 Drawing Sheets

Fig-6

| POWER SUPPLIES #1 THROUGH #7 | | | |
|---|---|---|---|
| #1 | *101* | +22v GND -22v | 250 mA MAX. | A/D CONVERTER |
| #2 | *102* | +5v GND | 400 mA MAX. | MICROCONTROLLER |
| #3 | *103* | +5v GND -5v | 200 mA MAX. | LEVEL DETECTOR |
| #4 | *104* | +5v GND | 50 mA MAX. | HUMAN INTERFACE |
| #5 | *105* | +5v GND | 50 mA MAX. | ROTATION DECODER |
| #6 | *106* | +5v GND / +5v GND / +12v GND -12v | 600 mA MAX. / 50 mA MAX. / 20 mA MAX. | PRINTER INTERFACE AND MECHANISM |
| #7 | *107* | +75v OR -75v | 1A MAX. | PUMP DRIVE |

FLUID LEVEL MAINTENANCE SENSOR FOR USE IN A TANK TEST SYSTEM

This is a divisional of application Ser. No. 07/174,762, U.S. Pat. No. 4,954,973, filed on Mar. 29, 1988.

BACKGROUND OF THE INVENTION

1. Field of the Invention

The present invention relates to tank tightness testers for measuring the tightness of tanks, including, but not limited to, underground fuel storage tanks, and the method of performing the test, and more particularly relates to a microprocessor controlled leak tester for such tanks.

2. Background Information

Applicant's assignee is the successor in interest to Kent-Moore Corporation of Warren, Michigan, the assignee of U.S. Pat. No. 3,508,055 entitled "TANK SYSTEM TIGHTNESS TESTER". This patent is the closest prior art of which we are aware. The purpose of the present invention is to automate tank testing, and at the same time to do so according to a method which makes such tank testing even more accurate than previously possible by taking into account factors that were not fully realized in the development of previous tank tightness testers.

While said earlier U.S. Pat. No. 3,580,055 appreciated the need to stabilize temperature within the tank being tested, the inventor therein did not fully realize the effect which deflection of the tank ends has on tank volume. The pressure exerted by the fluid in a tank deflects mainly the ends of the tank, there being little deflection, if any, on the sides of the tank. But the pressure exerted on those ends is considerable. For example, gasoline in a tank having a 10 foot diameter will exert 3.16 tons of pressure on the ends of the tank, and gasoline in a 15 foot diameter tank will exert 4.74 tons on the end of the tank. The pressure will of course vary with the specific gravity of the fluid contained.

If the ends of the tank do not abut up against a solid surface, such as a concrete container for example, but instead are open to the air, or in the example being used for illustration in the present application, are buried underground, the tank ends will deflect under said aforementioned pressure until a stabilized condition is reached because the only resistance to said deflection is the ground water pressure.

Such stabilized condition takes some time to occur, and in the time available for testing can only be closely approximated. Thus, it is desirable to perform the tank tightness test as quickly as possible. In the prior art there are known various methods for attaching a standtube to the inlet of an underground tank, and filling such standtube, for example, to 40 inches above the ground level to purposely create a head greater than one wants during the actual test, and to create a large rate of deflection of the ends of the tank, then the level is lowered in the standtube and kept at this level to have the tank at a nearly zero rate of deflection.

Failure to take into account the expansion of the tank will give a false indication of a leak. For example, a tank having a diameter of 96 inches will initially have a deflection of 0.125 inches, which results in an apparent loss of 3.92 gallons of fuel. It is, therefor, absolutely necessary to compensate for the deflection of the walls of a tank when calculating the change in the volume in a tank during a test procedure, or considerable time will be required before equilibrium is reached.

However, many of the prior art methods, including the aforementioned U.S. Pat. No. 3,580,055, use a method which determines the change in the height of a fluid column within a standtube connected to the tank at predetermined time intervals, and the temperature is simultaneously measured within the tank at the same time intervals, and a temperature correction factor alone is used to determine if the tank is tight. This method completely ignores the influence which the continued expansion of the tank ends, albeit at a small rate, has on the tank volume. The present invention not only continuously circulates the fluid in a tank and continuously compensates for any change in temperature therein, but also continuously monitors and keeps the fluid in a standtube at a preset level, measuring any fluid added to, or taken from the standtube, to keep the tank whose tightness is being measured in as close to an equilibrium condition as is possible, so as to absolutely minimize the effects of tank end deflection on a tank volume measurement.

SUMMARY OF THE INVENTION

There is disclosed a system for tank tightness testing including a pump means for continuously circulating a fluid within a tank whose tightness is to be measured to stabilize the temperature therein, a temperature sensing means to continuously measure the temperature of the fluid being circulated, a standtube means to create a head in said tank and monitor any fluid added to or subtracted from said tank, a level sensor and pump means for keeping said head constant, and a control means to operate said level sensor pump means, and said temperature sensing means.

Thus, it is one of the objects of the present invention to provide a microprocessor controlled leak tester for storage tanks.

It is another object of the present invention to provide a tank leak tester of the foregoing nature which stabilizes the temperature in a tank whose tightness is being measured, by continuously circulating the fluid in the tank during a test.

It is a further object of the present invention to provide a microprocessor controlled tank leak tester wherein the effect of the deflection of the tank ends on the measurement of tank tightness is eliminated.

It is a further object of the present invention to provide a microprocessor controlled tank leak tester of a portable nature which can be moved from test site to test site, as required.

A still further object of the present invention is to provide an automated tank leak tester of the foregoing nature, wherein most measuring is done under machine control to reduce the possibility of human error.

A still further object of the present invention is to provide an automated tank leak tester adapted to test a wide variety of tank sizes and diameters.

A further object of the present invention is to provide an automated tank leak tester which can test tanks for tightness regardless of the product in the tank at the time.

A further object of the present invention is to provide a tank tightness testing system which will take into account specific gravity and temperature during its operation.

A further object of the present invention is to provide a novel level sensor for use with a tank leak testing system.

Further objects and advantages of the present invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 6 is a table showing the requirements for the power supplies shown in FIG. 5.

Figure 1A:
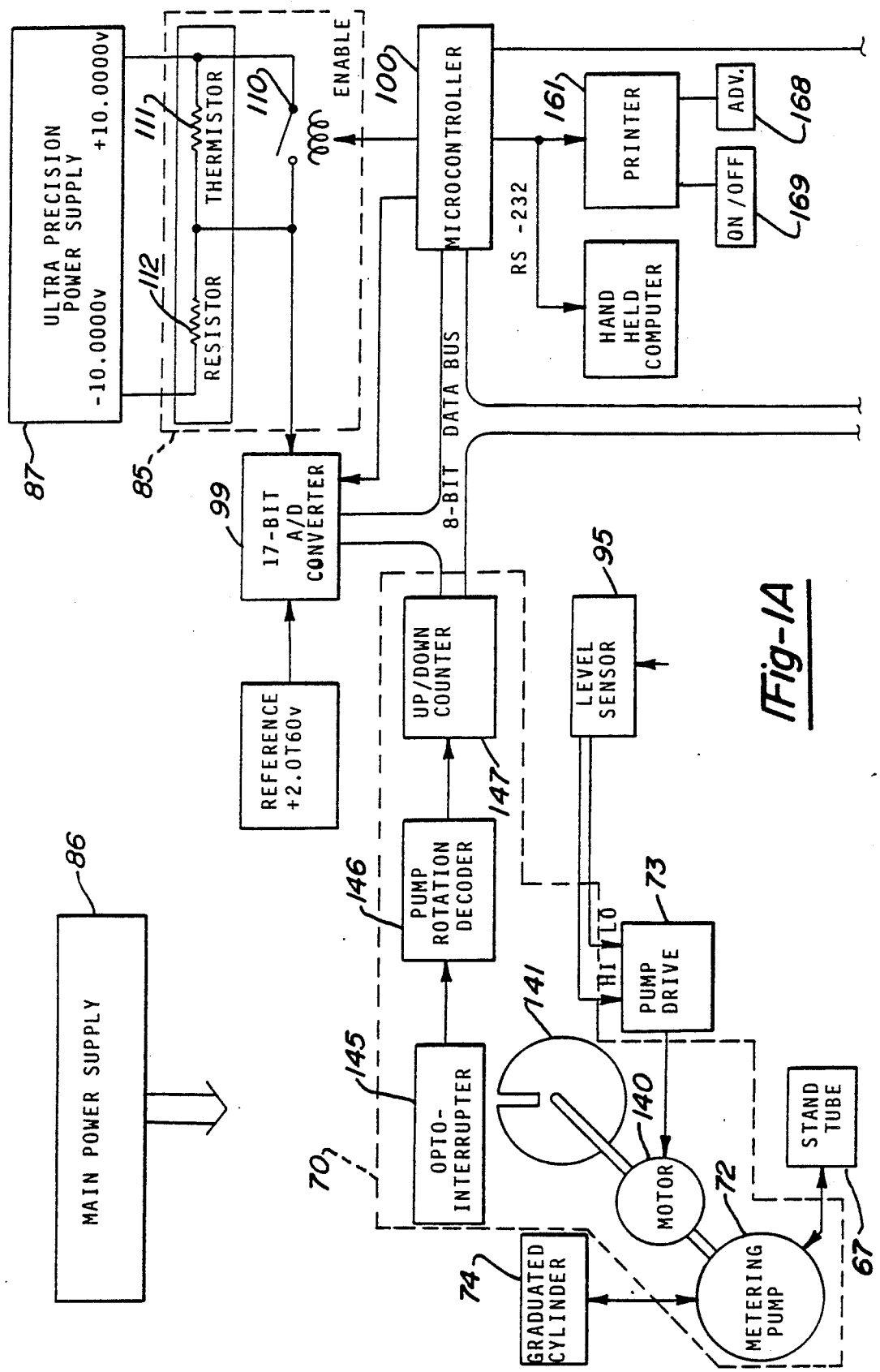
FIG. 1A is a diagrammatic view of a portion of a system embodying the present invention.

It is to be understood that the present invention is not limited in its application to the details of construction and arrangement of parts illustrated in the accompanying drawings, since the invention is capable of other embodiments, and of being practiced and carried out in various ways within the scope of the claims, also, it is to be understood that the phraseology and terminology employed herein is for the purpose of description, and not of limitation.

DESCRIPTION OF THE PREFERRED EMBODIMENT

Many methods in the art use the technique of attaching a standtube to an underground storage tank to create an extra pressure against the end walls of the tank and stabilize the formation of the tank geometry so that the effects of deflection of the tank ends will be minimized while it is attempted to determine if the tank is tight. The U.S. Pat. No. 3,580,055 owned by the assignee of the present application discloses one of the most successful methods to date of measuring the tightness of storage tanks of all types including underground storage tanks. The specification of said U.S. Pat. No. 3,580,055 is hereby incorporated in its entirety by reference into the present specification. Said U.S. Letters Patent was a commercial success because up until the invention disclosed therein, there was no accurate way to measure the tightness of a tank because no one had up until that time successfully allowed for stabilization of the temperature in the tank.

As successful as this system was however, after a number of years of use, and as technology advanced, it was found, unexpectedly, that in spite of circulating the fluid inside a tank the temperature did not stabilize as much as was thought previously, and because fluid was removed or added to a standtube only once every fifteen minutes or so, the tank ends continued to deflect between the measurement periods, thus affecting the reading. Therefore, it was determined that a more accurate system had to be developed to prevent the possible rejection of storage tanks which really were tight, but which were held to be leaky because of erroneous readings.

It was initially thought that no more than a continuous measurement of the temperature in a tank would be needed to correct the problems in the old system. However, it was not until it was realized that there must be a static head in the standtube, ie: fluid must be continually added and subtracted to keep a tank at as nearly an equilibrium position as possible to minimize the effects of tank end deflection, that a satisfactory system was developed.

The present method and apparatus continuously circulates the fluid within a tank in much the same manner as it was circulated in said U.S. Pat. No. 3,580,055, but adds to the apparatus disclosed in said Letters Patent a novel apparatus and method to continuously measure the input or loss from a standtube connected to the tank, to continuously measure the temperature in the tank, and then to determine the difference between the volume of fluid added to, or subtracted from the standtube, and the volume change due to the change in temperature occurring in the tank, to arrive at a true reading of the change in volume.

The importance of minimizing the effects of tank end deflection have been discussed above. The importance of measuring for temperature variations within the fluid system, and the deflection of the walls of the container, may be illustrated by a few examples, taking gasoline as a standard. The standard established by the National Fire Protection Association for gasoline states that 0.05 gallons per hour is the maximum loss permissible in an underground storage tank, and it will be seen that this loss may not even be detected without accurate correction for temperature and pressure. The coefficient of expansion for gasoline is approximately 0.0006 of the volume per degree Fahrenheit. Therefore a change of 1 degree Fahrenheit results in a 0.6 gallon change in the volume of a 1,000 gallon tank of gasoline and six gallons in a 10,000 gallon tank. The deflection of the tank ends has a similar effect, thus the method used in the present system very accurately determines and corrects for the effects of these two sources of error.

Figure 1B:
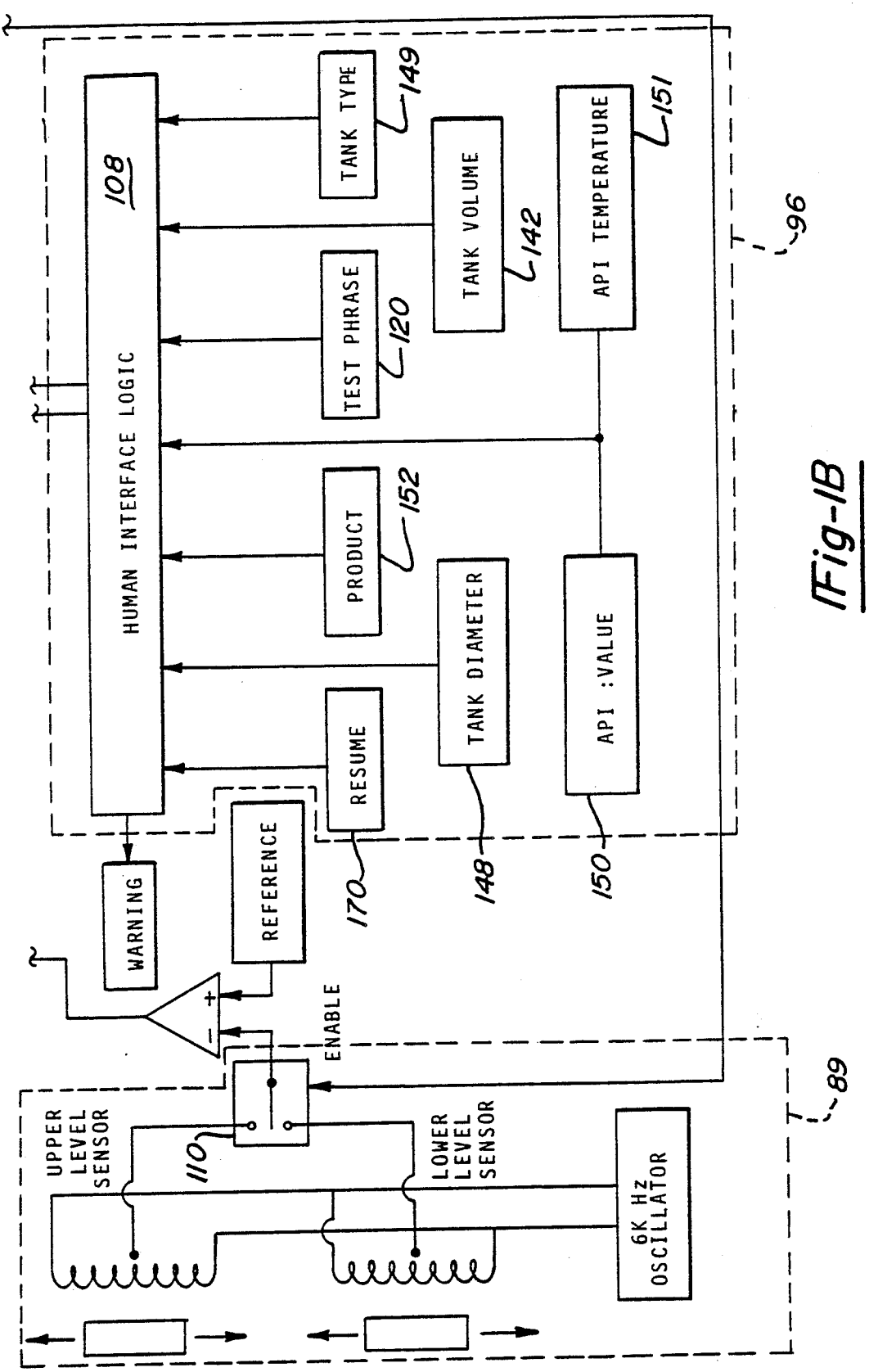
FIG. 1B is a diagrammatic view of the balance of the system shown in FIG. 1A.
Figure 2A:
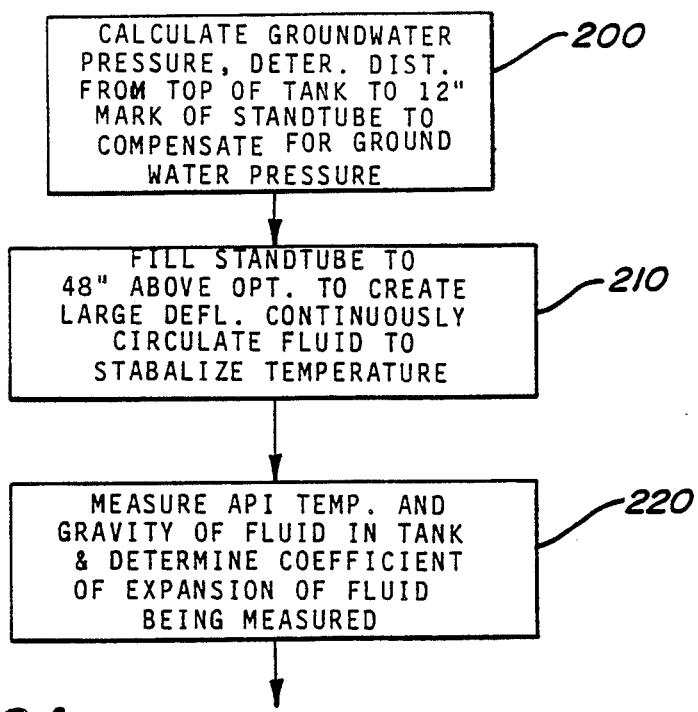
FIG. 2A is a flow chart showing a portion of the steps used in the operation of the system shown in FIGS. 1A and 1B.
Figure 2B:
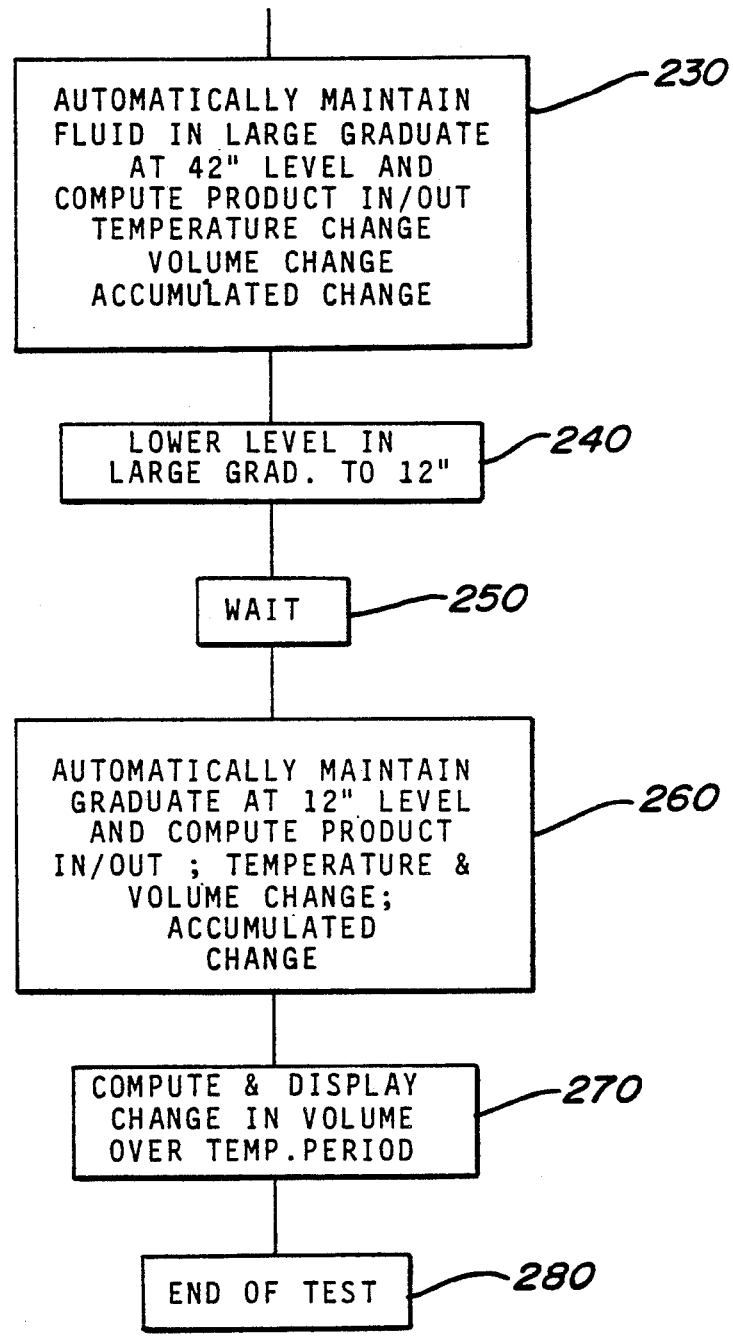
FIG. 2B is a flow chart showing the remainder of the steps used in the operation of the system shown in FIG. 2A.

Referring now to FIGS. 1A and 1B, there is shown an overall diagrammatic view of a system embodying the present invention, and there is shown in block form, in FIGS. 2A and 2B, the basic series of steps performed by the system of the present invention. For convenience of description, and for the convenience of the operator in using the apparatus to be described hereinafter to perform the method, the test is divided into four phases. For the purposes of illustration, throughout the present application it will be assumed that the test is being conducted on a 10,000 gallon tank.

Figure 3:
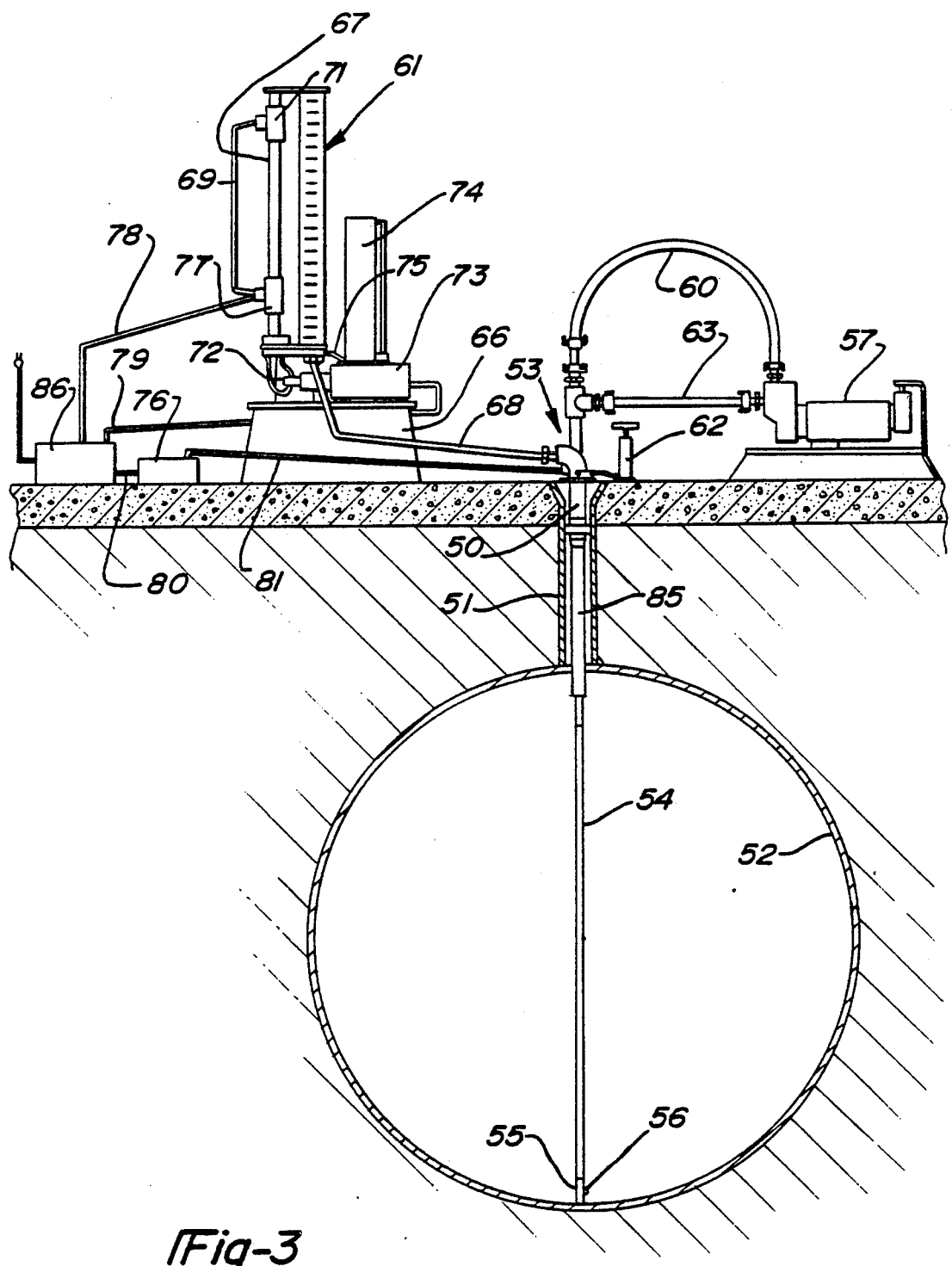
FIG. 3 is an elevation view of the construction of the system shown in FIGS. 1A and 1B.

Referring now to FIG. 2A, the first phase of the test will involve calculating the ground water pressure, if an underground storage tank is involved, as test tank 52 in FIG. 3, (Block 200). This must be done to assure that in Phase 1, when the standtube 61 (FIG. 3) is filled to a 48 inch level, this action creates the desired, initial, large deflection in the tank ends. If the test tank 52 has substantial ground water pressure on it, the 48 inch height of fluid in the standtube 61 may actually only be equivalent to a few inches in height because of the ground water pressure, thus the ground water pressure must be neutralized, and one can calculate the ground water pressure on the tank 52 by The 4 Pound Rule, known in the art, to determine what type of head is needed to neutralize the ground water pressure. This head is obtained by placing the 12 inch mark of the standtube 61, which will be described in more detail hereinafter, at a height above the top of the tank which is needed to neutralize the said ground water pressure.

Referring now to FIG. 3, in order to attach the standtube 61 to the test tank 52, a seal adaptor 50, which may be the same as disclosed in U.S. Pat. No. 4,514,091, entitled "Tank Tightness Test Apparatus", issued May 15, 1979, and owned by the assignee of the present patent application, is placed into the fill pipe 51 which is attached to the tank 52. The seal adaptor 50 is expanded by means of compressed air, which may be supplied by hand pump 62, to seal the probe assembly 53 in the fill pipe 51. The discharge tube 54 is then assembled and inserted through the seal adaptor 50 until the end 55 of the discharge tube 54 rests against the bottom of the tank 52, as shown in FIG. 3. The above ground end of the discharge tube 54 is marked to indicate the direction of the discharge nozzle 56, and the discharge tube 54 is rotated to direct the discharge nozzle 56 at a 45 degree angle from the axis of the tank 52. A fluid circulation pump 57 is then positioned, and a pump inlet tube 63 and a pump outlet tube 60 are connected to the probe assembly 53. The system described thus far may be referred to as the product circulating system which runs continuously throughout the entire test and which will be described in more detail hereinafter. It is preferable that the pump inlet tube 63 be clear or transparent so that the operator may see if there is excess air entrained in the system which would affect the measurement to be taken hereinafter. Since the system is now sealed it is necessary to bleed air from the system before progressing.

A metering pump 72 and a metering pump drive 73 are now placed on a platform 66 of a height sufficient to raise the 12 inch mark of the standtube 61 to that previously calculated as being necessary to compensate for the ground water pressure on the tank 52. The standtube 61 is connected to the probe assembly 53 by a means of a first conduit 68. Also provided is a graduated cylinder 74 to more easily adjust the level of the standtube 61.

Proceeding to Phase 1 of the test, the tank 52 is filled to a 48 inch level in the standtube 61. The circulation pump 57 is operated to circulate the fluid in and out of the tank 52 to stabilize the temperature in the tank 52. The length of time that the fluid will be circulated to stabilize the temperature is determined by several factors, including the material of which the tank is made, and the capacity of the tank. The first phase of the test (Blocks 200, 210, FIG. 2A) will continue for the temperature stabilizing time, after which time Phase 2 of the test (Block 220) will be entered.

In Phase 2 of the test, it is necessary for the API temperature and API gravity of the fluid to be measured by the operator. It is necessary to measure the temperature and gravity of the sample in the tank 52 to determine the coefficient of expansion of the fluid in the tank 52. This is necessary so that a starting point maybe determined for Phase 3 of the test. Phase 1 of the test may last anywhere from under one hour for a small tank, to over three hours for a large tank, during which time period the fluid is continuously circulating to stabilize the temperature as much as possible while the tank 52 is continuing to deflect under the head created by the 48 inches of fluid in the standtube 61.

Figure 4:
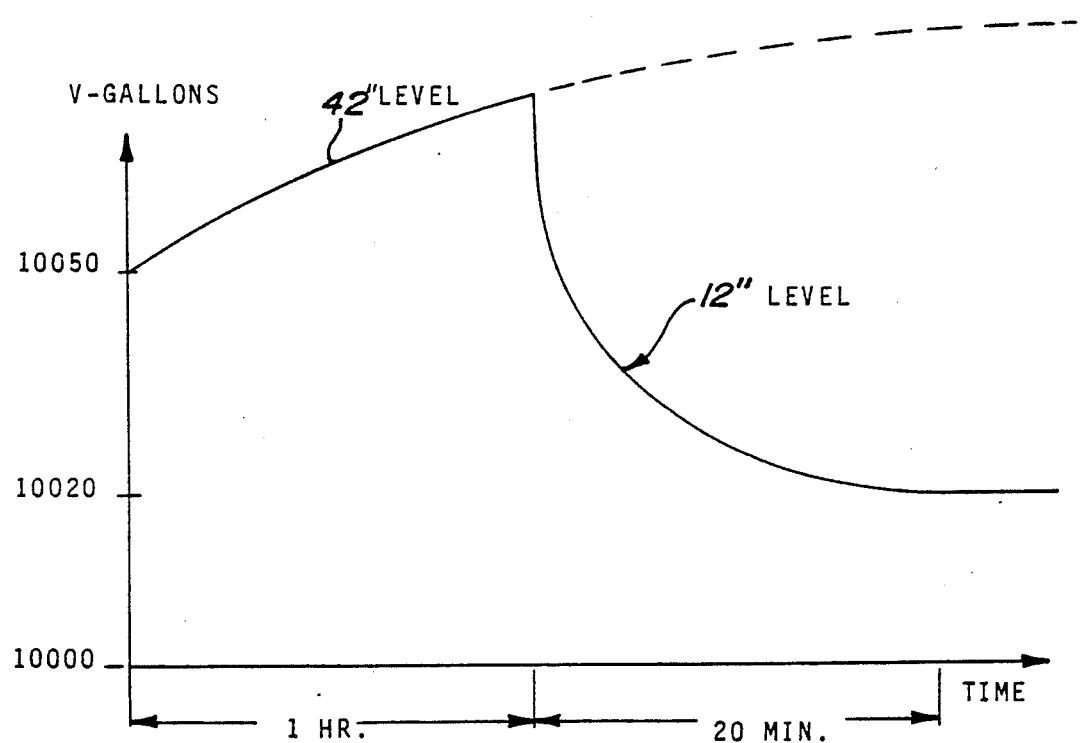
FIG. 4 is a graph showing the change in tank volume versus time due to the deflection of the tank ends.

Before describing Phase 3 of the test, it is necessary to give a further explanation of the tank geometry relating to the tank ends. Referring now to FIG. 4, which is a graph of tank volume versus time, it can be seen that while the standtube 61 is filled to the 48 inch level, the tank may keep expanding almost indefinitely due to the large pressure exerted on the tank ends. For example, gasoline in a test tank having a 5 foot diameter will exert 1.58 tons of pressure on the ends of the test tank, while a 10 foot diameter test tank will have 3.16 tons of pressure exerted on the ends, and a 15 foot diameter test tank will have 4.74 tons of pressure exerted on the ends. At this amount of pressure, the deflecting of the test tank ends will continue for many, many hours, and would delay the test beyond practicable limits. As can be seen by referring to FIG. 4 however, once the extra test tank deflection has been caused by initially filling the standtube 61 to a 48 inch level, and then maintaining it at a 42 inch level for a predetermined period of time (Phase 3) by dropping the standtube level now to a 12 inch level (Phase 4), further deflection is minimized, and as long as the head on the test tank is kept at a constant 12 inches above the zero mark of the standtube 61, test tank deflection plays a small part in the change of volume in the test tank.

Having determined the coefficient of expansion in Phase 2, it is possible now for the microcontroller 100 (FIG. 1A), used in the system, to maintain the level in the standtube 61 at 42 inches, and compute the product being either put in or taken out of the standtube 61. This is Phase 3 of the test, and its purpose is to provide the microcontroller 100 with initial values for the actual tank tightness test which will take place in Phase 4.

Thus it is the purpose of Phase 3 of the test (Block 230) to continue for a predetermined period of time, observing the characteristics of the system, and it is then the purpose of Phase 4 (Blocks 240-280) to lower the level in the standtube 61 to a point where the effect of deflection on the measurements is minimized, and to continue to accurately measure the product in, the product out, the temperature change and the volume change to calculate the actual change in volume over the test period, thereby determining the tank leakage. Referring to FIG. 3, the 42 inch level in phase 3 of the test is automatically maintained in the standtube 61 by means of the upper level sensor 71 surrounding the level sensing tube 67, which will be described in more detail hereinafter.

Every change in the level of fluid in the level sensing tube 67 which is detected by the upper level sensor 71, is instantly compensated for by the operation of the metering pump 72, which is connected to a metering pump drive 73, and in turn to the standtube 61 by means of second conduit 75. The upper level sensor 71 is connected by a cable 69 to the lower level sensor 77, to be described hereinafter, which is in turn connected by a first cable 78 to a power supply 86.

The metering pump 72 is connected by means of a second cable 79 to the power supply 86, while the system controller 76 which operates the system is connected by means of a third cable 80 to the power supply 86. The temperature sensor system or probe, generally designated by the numeral 85 (FIG. 3), is connected by means of a fourth cable 81 to the system controller 76.

A more detailed explanation of the hardware used in the apparatus of the present invention can be had by referring to FIGS. 5-12.

The system basically comprises a main power supply 86 (FIG. 5) which is connected to a power supply 87, which, in turn, is connected to the system controller 76.

Connected to the system controller 76 are the metering system 70, the level sensor system 89 and the temperature sensor system 85.

The system controller 76, in turn, includes the microcontroller 100 and the analog-to-digital converter 99, the level detector 95, the human interface 96, the printer interface and mechanism 97, and various lamps and switches 98.

As was discussed hereinabove, the change in temperature, once the deflection of the tank is minimized as a factor in the measurement of tank volume, becomes critical. In order to have the accuracy of the system read in increments of 1/1,000th degree, which is necessary to have the necessary resolution to detect volume changes of 0.05 gallons per hour in the largest underground storage tanks, one must divide the range over which one expects to test the temperature of the tank by 0.001 degrees. The temperature of the products in underground storage tanks has been found to vary from 20 degrees Fahrenheit in Alaska, to 110 degrees Fahrenheit in Texas. It is recommended that tank tests should not be performed at over 100 degrees Fahrenheit, so that if you want 1/1,000 of a degree accuracy, you must divide the 80 degree range by 0.001, which divides the temperature into 80,000 parts. Eighty thousand is greater than 2 to the 17th power, so to obtain the necessary resolution a 17-bit analog-to-digital converter 99, together with a Basicon Model MC11 microcontroller 100 was chosen. The need for this accuracy dictates the use of a particular power supply to power the analog-to-digital converter 99.

The power requirements for the system controller 76 can be seen referring to FIG. 6. The power supply 87 consists of a first power supply 101, a second power supply 102, a third power supply 103, a fourth power supply 104, a fifth power supply 105, a sixth power supply 106, and a seventh power supply 107. The requirements which these power supplies must meet are set forth in the table shown in FIG. 6. Given this information, one skilled in the art of designing power supplies can easily build the required power supplies, and no further detail thereon is needed.

Figure 7:
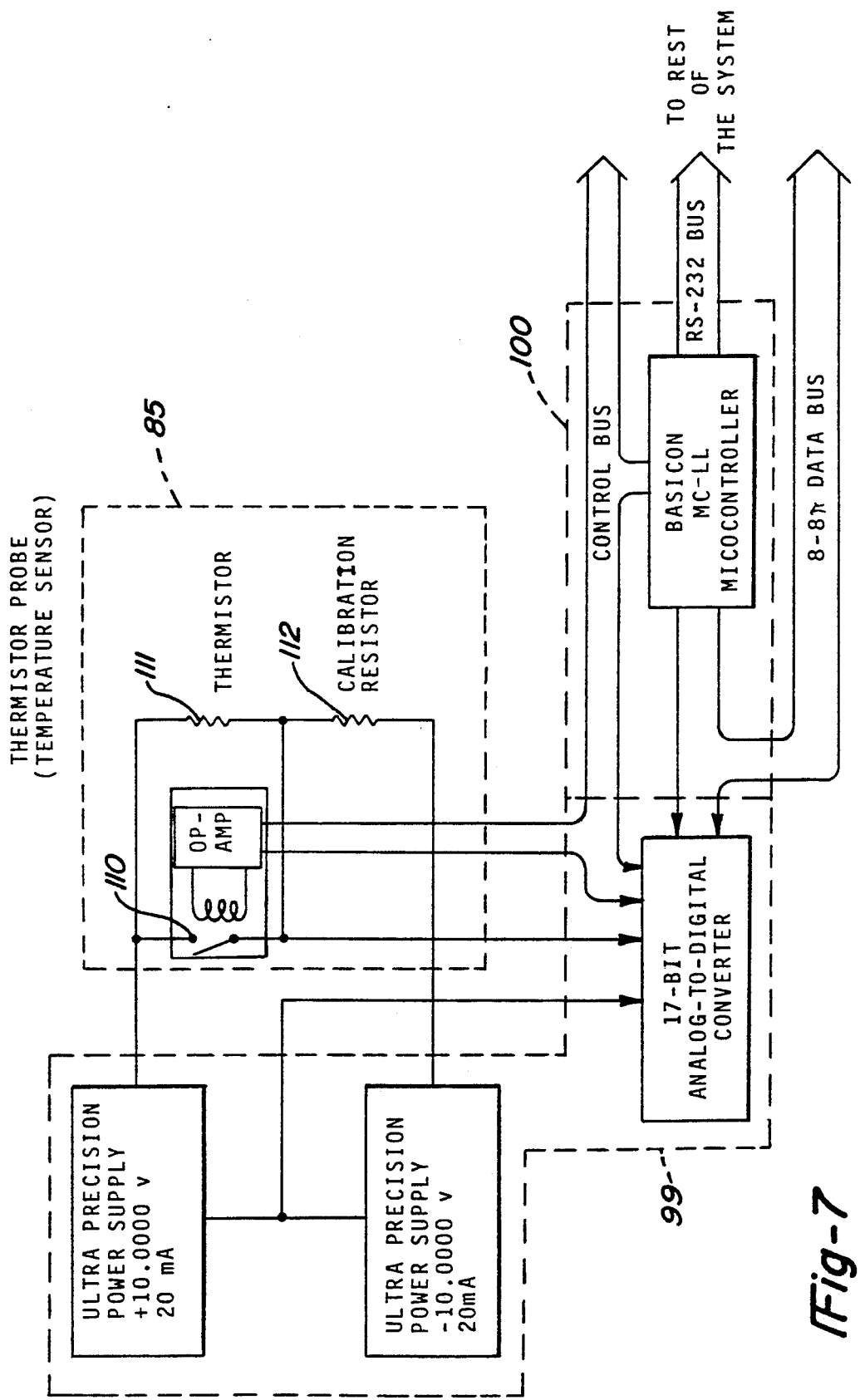
FIG. 7 is a more detailed schematic diagram of the microcontroller and analog-to-digital converter shown in FIG. 5.

Referring to FIG. 7, the requirements for dividing the voltage into 2 to the 17th parts dictates the characteristics of the power supply, included in the analog-to-digital converter 99. The voltage of +10.0000 volts and −10.0000 volts at 20 milliamps is rather high for systems of this type. Howerver, this voltage is needed in order to have a recognizable difference when it is divided into 2 to the 17th parts. Any smaller voltage than this will make it hard to monitor the voltage signal in a noisy environment. This, however, gave additional problems in the design of the temperature sensor system 85. Since the temperature sensor system 85 consists of a thermistor 111, generally in the range of 800 ohms to 3,000 ohms and a calibration resistor of 1,500 ohms, sending such a high voltage through the thermistor 111 will cause the thermistor 111 to heat and have its own effect on the temperature of the product whose volume is being measured. To eliminate this effect, the microcontroller 100 sends a series of very high signals to the enable relay 110. It sends 5 pulses per minute (of approximately 0.1 second duration) through the thermistor 111 and the calibration resistor 112. The microcontroller 100 will then average the 5 readings per minute from the thermistor 111 to obtain the temperature of the fluid in the tank.

Figure 8:
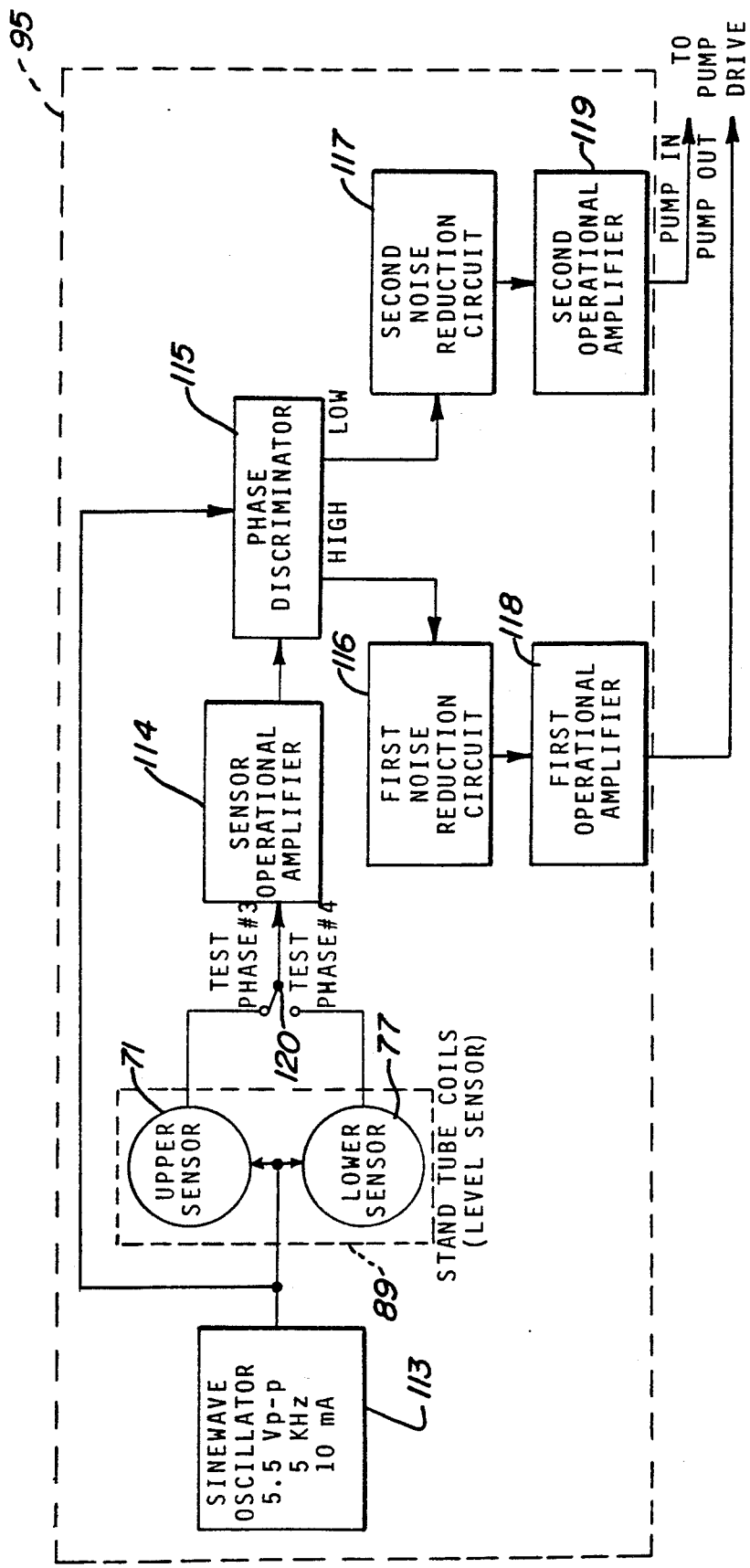
FIG. 8 is a block diagram of the level detector shown in FIG. 5.

Referring now to FIG. 8, additional details concerning the construction of the level detector 95 can be seen. A sine wave oscillator 113 is connected to both the upper level sensor 71 and the lower level sensor 77. The sine wave oscillator 113 is a 5.5 volt peak to peak oscillator of 5 kilohertz frequency, putting out a 10 milliamp current. This is sufficient to drive the coils in the upper level sensor 71 and the lower level sensor 77, the construction of which will be described in detail hereinafter. The output of the sine wave oscillator 113 is connected to the upper level sensor 71 and the lower level sensor 77, and also to a phase discriminator 115. If the test phase switch 120 is set for Phase 3, which is maintaining the level in the standtube 61 at 42 inches, the center tap of the upper sensor 71 will be connected through a sensor operational amplifier 114 to the phase discriminator 115.

If the test phase switch 120 (FIG. 8) is set to Phase 4, which is performing the actual test at the 12 inch level in the standtube 61, the center tap of the lower level sensor 77 will be connected through the sensor operational amplifier 114 to the phase discriminator 115. The phase discriminator 115 will detect any difference in phase which occurs between the sine wave supplied directly from the sine wave oscillator 113 and that being received from the sensor operational amplifier 114, and by detecting this shift in phase, will be able to tell whether the level is too high, too low, or being maintained constant. If the phase discriminator 115 detects that the sine wave from the sensor operational amplifier 114 is leading the signal received from the sine wave oscillator 113, the system knows that the float 127 of the level sensor 89 is above the center position. If the phase detected by the phase discriminator 115 from the sensor operational amplifier 114 is lagging that received from the sine wave oscillator 113, then the system knows that the float 127 is below the center position.

If both signals are in phase, the system knows the level is at the set point. If the float 127 is above the center position, a signal will be supplied from the high output of the phase discriminator 115 to the input of the first noise reduction circuit 116, through the output of the first noise reduction circuit 116 to the input of the first operational amplifier 118, and from the output of the first operational amplifier 118 to the pump drive 73 to cause the metering pump 72 to pump fluid out of the standtube 61.

On the other hand, if the phase discriminator 115 detects that the float 127 is below the center position, in other words, is too low, the low output of the phase discriminator 115 will supply to the input of the second noise reduction circuit 117 a signal which will be sent via the output of the second noise reduction circuit to the input of the second operational amplifier 119, and a signal will be sent from the output of the second operational amplifier 119 to the pump drive 73 to cause the pump 72 to pump fluid into the standtube 61.

Figure 9:
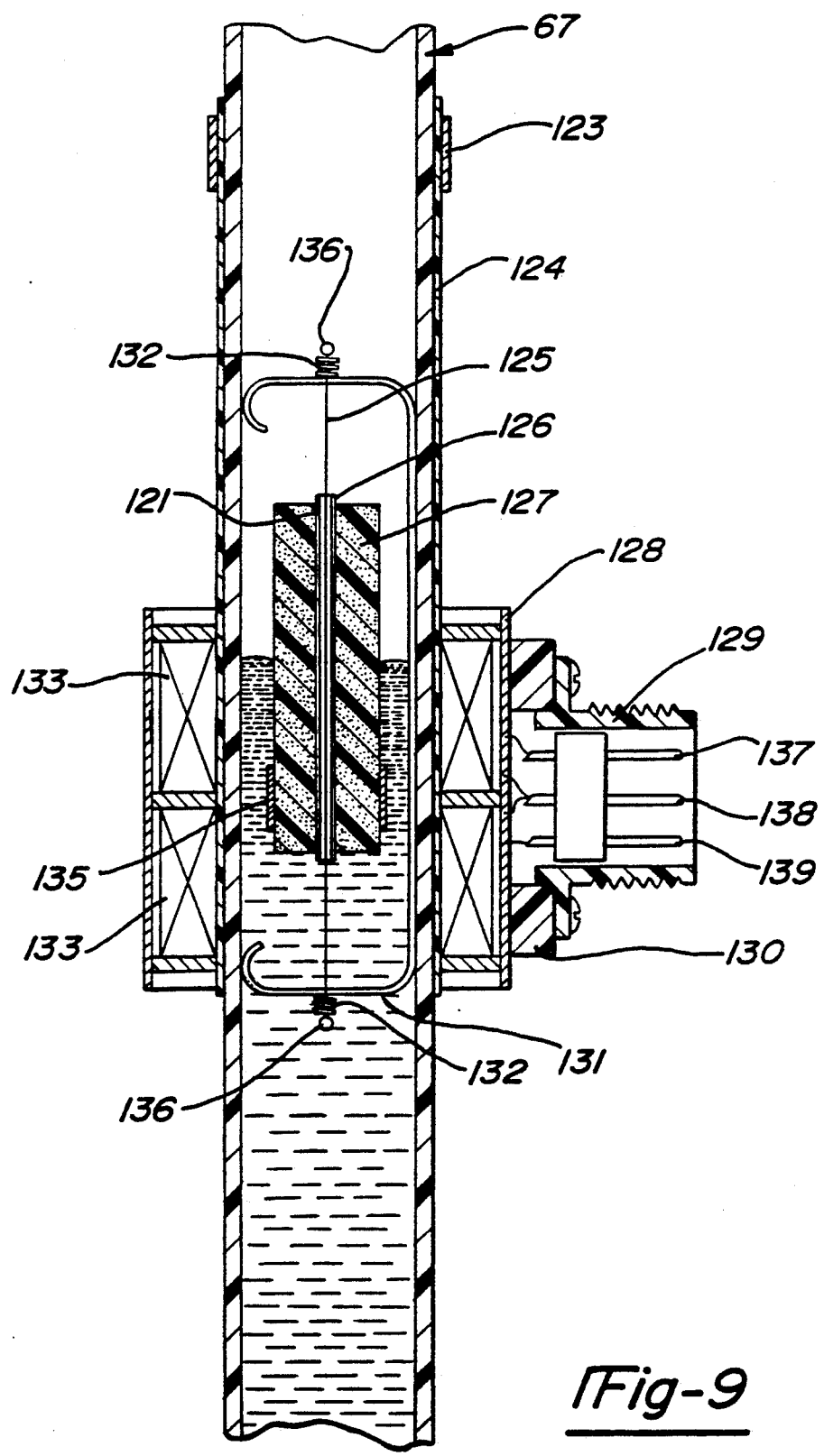
FIG. 9 is a detailed elevational view, partly in section, of a level sensor employed in the level detector illustrated in FIG. 8.

The manner in which the signals are sent to the first operational amplifier 118 can be best understood by referring to FIG. 9. Since the upper level sensor 71 and the lower level sensor 77 are identical, only one of the sensors need be described herein in detail. A level sensing tube is generally indicated by the numeral 67. It may be of any practicable material which can withstand any harmful effects from the fluid in the tank being tested. In many cases it is a plexiglass tube. A fiberglass coil assembly tube 124 is slipped over the level sensing tube 67 and it is held thereon by a suitable clamp 123. Mounted to the fiberglass tube 67 is a dual coil bobbin on which coil windings 133 are placed. The coil windings 133 are sufficient so that a float movement of 0.01 inches will cause a change in the output voltage which is detectable.

An insulating shield 128 is placed around the outside of the windings 133 to eliminate interference, and an insulator 130, such as an phenolic block, is mounted to the shield 128. A connector 129, is in turn, mounted to the phenolic block 130. The connector 129 has an upper contact 137, a center contact 138 and a lower contact 139. The upper contact 137 is connected to one lead from the upper coil, the lower contact 139 is connected to one lead from the lower coil and the center contact (or tap) 138 is connected to the beginning leads of the upper and lower coils.

Since the system illustrated herein is used for gasoline, an enclosure for the pump, and for any other item which might present a danger of explosion, is preferably made explosion proof in accordance with the normal safety recommendations in the field.

It can be seen that the way the coil windings 133 are arranged, so that if a ferromagnetic ring 135 is passed either above or below the center point of the combined coils, a signal will be induced and be sent to the sensor operational amplifier 114. In order to do this, a nonmagnetic bracket 131, which in the preferred embodiment is made out of stainless steel, is press fit into the level sensing tube 67 such that when the fluid is exactly at the 42 inch desired level, the ferromagnetic ring 135 placed about the circumference of the float 127 will be at the exact center point between the two coils such that no signal whatever will be produced.

In order to provide for up and down movement with a minimum of friction along the axis of the level sensing tube 67, the float 127 is provided with a central opening 121 which is lined with a low friction lining, such as a "TEFLON" tubing 126. A monofilament line 125 is stretched between the ends of the bracket 131 and held in tension by the tension springs 132 acting between the bracket 131 and the caps 136, which may be made out of lead. Approximately 8 ounces of tension on the monofilament line 125 has been found desirable. It can be seen that this provides a very low friction or resistance to movement, such that friction will be negligible and not affect the operation or the readings obtained from the float 127.

In order that the float 127 itself not soak up the fluid being tested, it is preferable that the float 127 may be made out of a closed cell foam, and in the preferred embodiment an expanded urethane foam, such as product No. P3214/FSA, available from Foamseal, Inc., 2425 North Lapeer Road, Oxford, Mich. 48051, is used.

Figure 5:
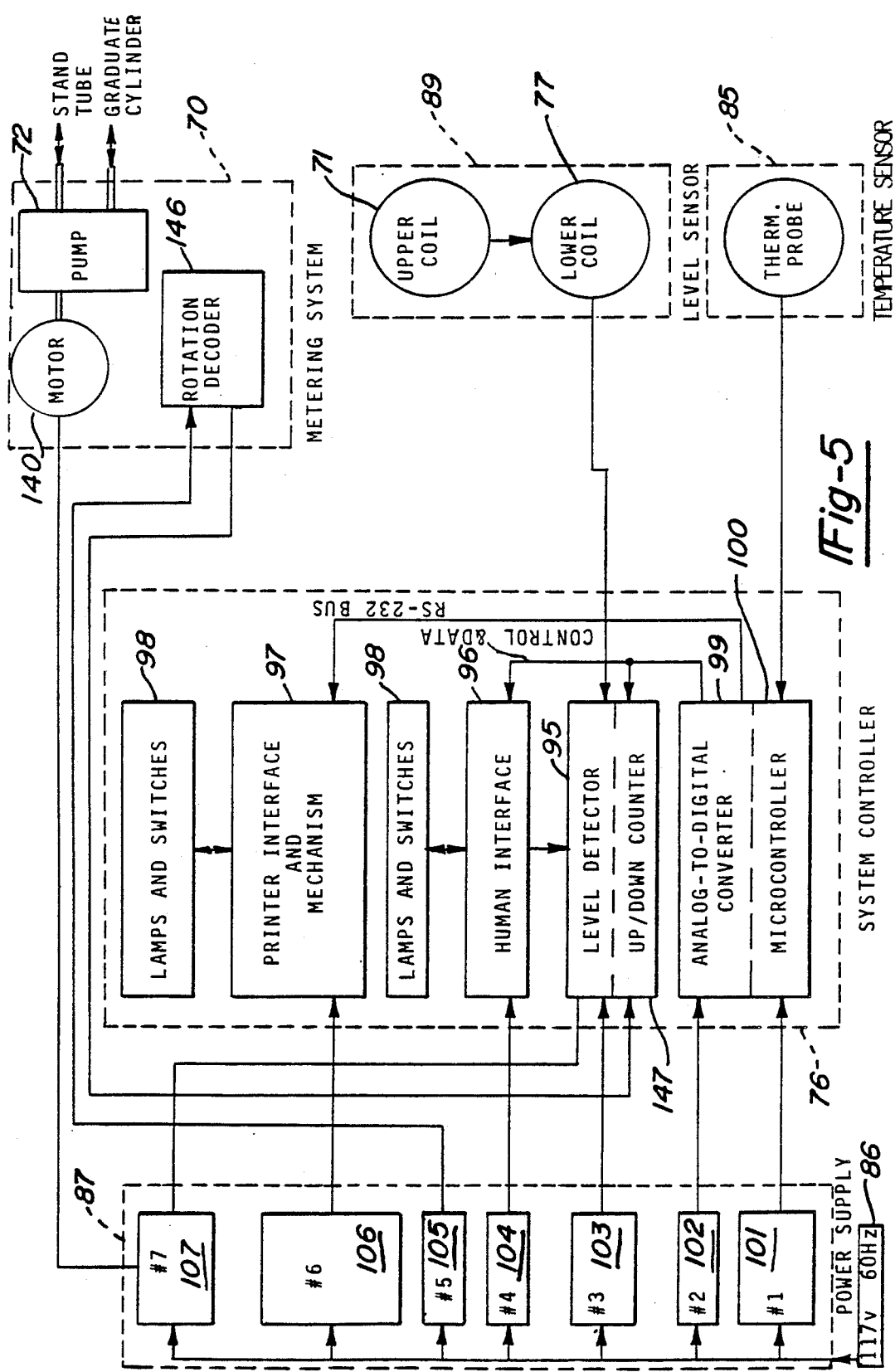
FIG. 5 is a schematic diagram of the construction shown in FIG. 3.
Figure 10:
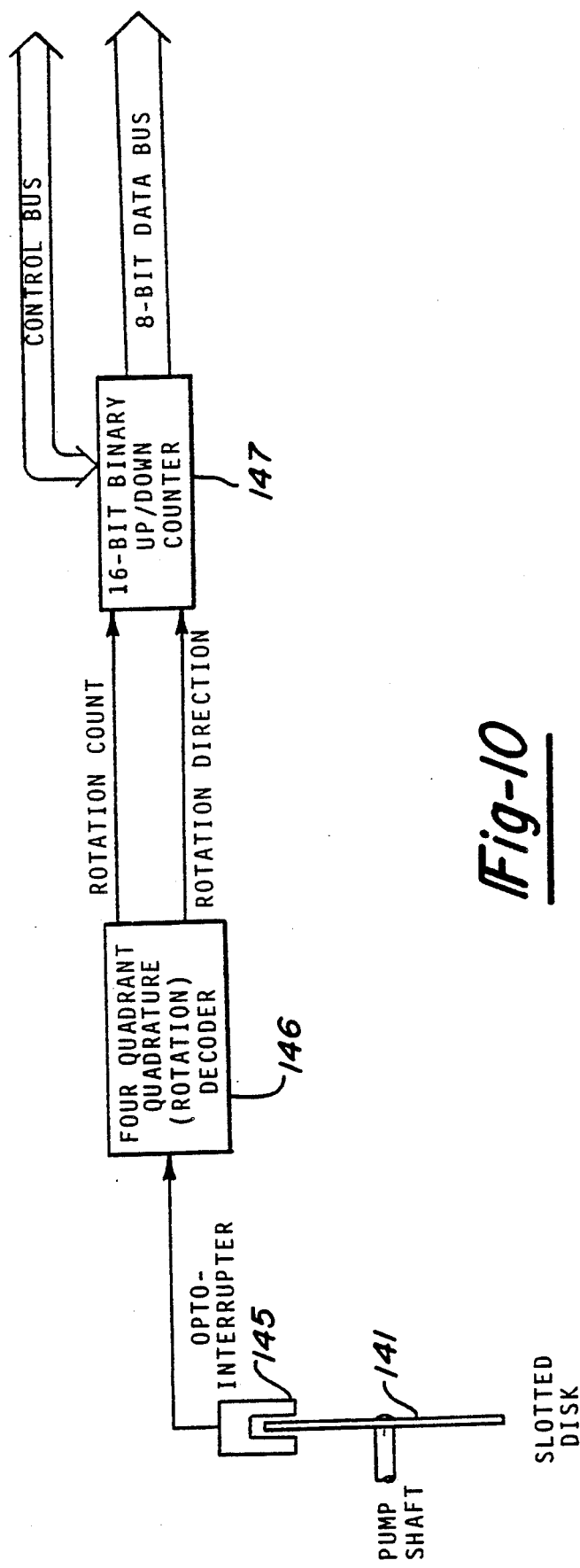
FIG. 10 is a schematic diagram of the rotation decoder employed as part of the pump drive of FIG. 3.

Referring now to FIGS. 5 and 10, and assuming that one of the sensors 71 or 77 sends a signal that the level is too high through the first operational amplifier 118, this signal will be supplied to the metering pump motor 140 (FIG. 1A), which may be such as Model 42142, manufactured by Dayton Electric Company of Dayton, Ohio, which is a 50 V, 1 A, 1850 rpm D.C. Motor. The pump motor 140 is connected in turn to a very accurate metering pump 72, which may be such as the model QP1CKC pump manufactured by Fluid Metering Incorporated of 29 Orchard Street, Oyster Bay, N.Y. 11771. A pump drive 73 (FIG. 1A), and a 90 volt power supply, aid in the operation of the pump motor 140. Each stroke of the metering pump 72 will produce a flow of 0.32 cubic centimeters of fluid to or from the level sensing tube 67.

For the computer to monitor the amount of fluid being pumped into or pumped out of the level sensing tube 67, it is essential to know how many rotations the metering pump motor 140 makes, since each rotation of the pump motor 140 results in one stroke of the metering pump 72, and a 0.32 cubic centimeter increase or decrease in the amount of the fluid in the level sensing tube 67. This is accomplished, as can be seen by referring to FIG. 10, by mounting a slotted disc 141 to the shaft of the metering pump 72. The disc 141 is positioned so that it is operatively mounted proximate the opto-interrupter 145, which produces a pulse each time the slotted disc 141 makes a full revolution. The signal from the opto-interrupter 145 is supplied to a four quadrant quadrature (rotation) decoder 146, which will in turn supply to the system controller 76, through a 16-bit binary up/down counter 147 information as to how many rotations were made by the slotted disc 141, and the direction of rotation of the slotted disc 141. The 16-bit binary up/down counter 147 will keep track of the rotation count and rotation direction, and feed this information to the computer through an 8-bit data bus (FIG. 10).

Figure 11:
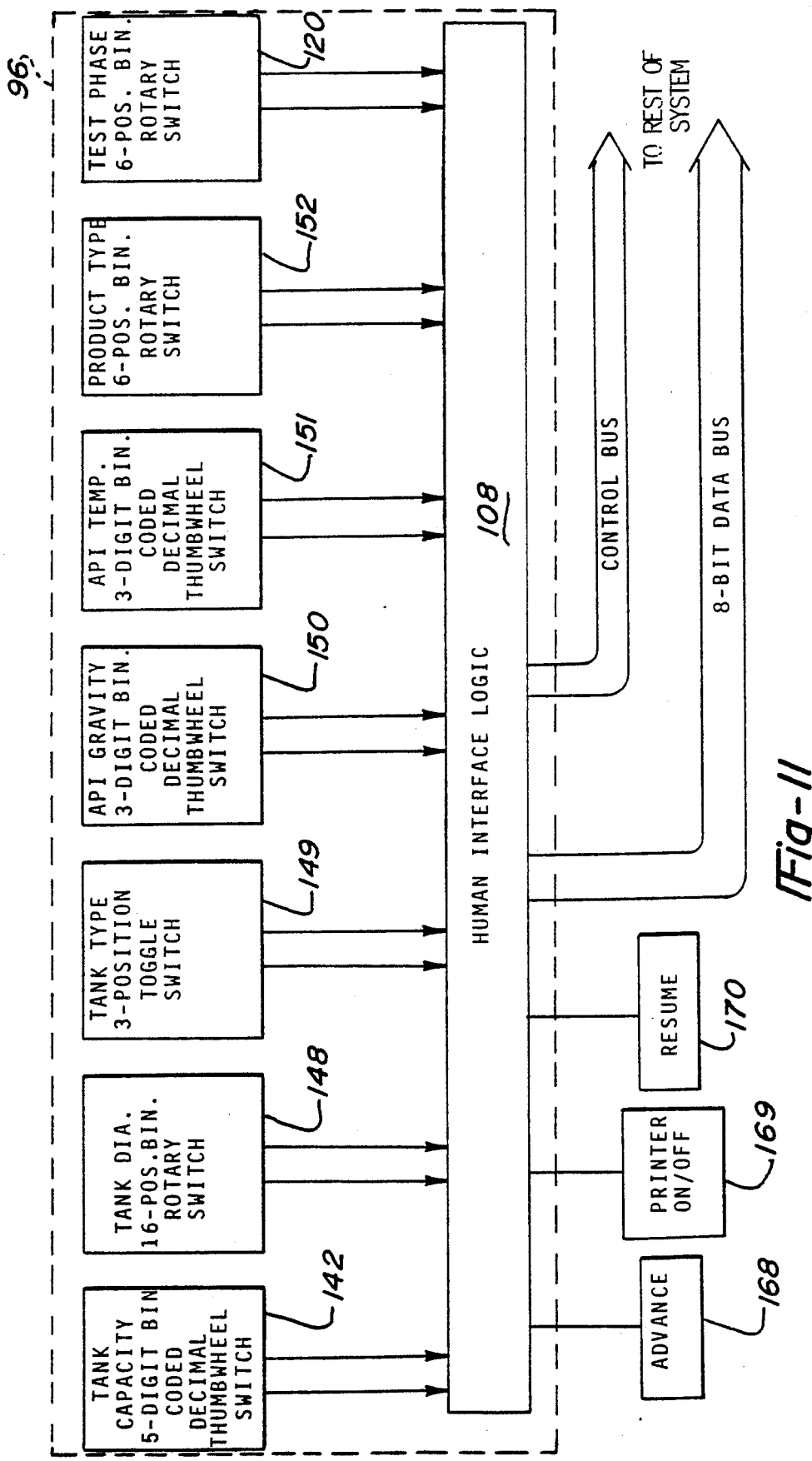
FIG. 11 is a schematic diagram of the human interface shown in FIG. 5.

The term human interface, being represented by the numeral 96 in FIG. 5, refers to the various switches which are set by the operator of the system prior to beginning the test. Prior to starting a tank test the operator must feed into the system controller 76 information on the tank capacity. This is done by setting the 5-digit tank capacity binary coded decimal thumbwheel switch 142 (FIG. 11).

Likewise, the operator must supply the system controller 76 with information on the tank diameter. This is done by a 16-position tank diameter binary rotary switch 148 which has a number of standard tank positions set thereon.

Because the tank type, ie: the material out of which the tank is made, affects the deflection of the tank, the system must have information on the composition of the tank, and this is set by the operator on the 3-position tank type toggle switch 149.

When the operator is in Phase 2 he will manually measure the API gravity and the API temperature in order to give the system information to compute the coefficient of expansion. The operator takes a sample of the product from the circulation loop, and by using special hydrometers and a thermometer measures the density and the temperature of the sample. The API gravity will be set on the 3-digit binary coded decimal switch 150, and the API temperature will be set on the temperature 3-digit binary coded decimal switch 151.

The product type, of course, affects the information fed into the system, and the product type is set on the product type 6-position binary rotary switch 152.

Figure 12:
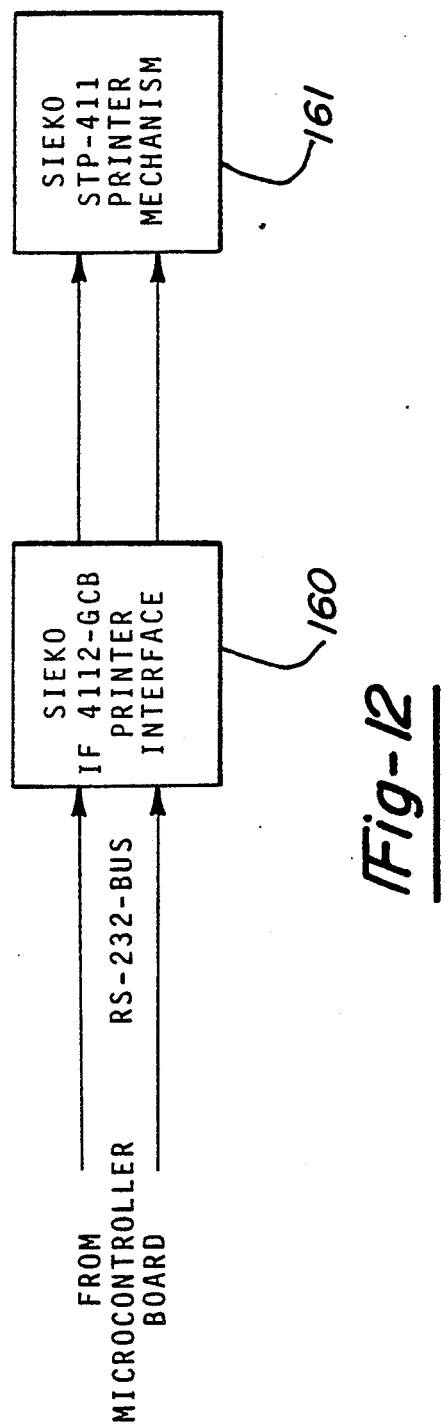
FIG. 12 is a schematic diagram of the printer interface and mechanism shown in FIG. 5.

To complete the description of the apparatus necessary to the operation of the present invention, referring to FIG. 12, the printer interface and mechanism 97 consists of a printer interface 160, which may be such as the Seiko IF 4112-ECB printer interface connected to the system controller 76 through an RS-232 Bus. Connected to the printer interface 160, is a printer mechanism 161, which may be such as a Seiko STP-411 printer mechanism. The printer mechanism 161, previously used during Phase 1 and Phase 2 to inform the operator of the length of those phases, is used during Phases 3 and 4 to continuously inform the operator concerning the amount of product being pumped in or out of the standtube 61, the temperature change from the previous reading, the volume change from the last reading, the net change (which is the product in or out minus the volume change due to temperature), and the accumulated volume change. Also, as will be explained hereinafter, the printer 161 can print out various warning messages to the operator, and will at the start of the test, print out the settings selected on the switches (120, 142, 148–152) connected to the human interface 96.

Referring now to FIGS. 1A and 1B, an actual example of the operation of the system can be given.

In actual operation, the operator must first set the proper setting on the various switches just described. The test phase switch 120 must initially be set to Phase 1. If switch 120 is not in position 1 during the power-up condition, the microcontroller 100 will cause the printer 161 to print out a warning message. After the operator makes certain that the test phase switch 120 is in the proper position, he must set the tank diameter switch 148. This is a 16-position binary rotary switch providing the selection of different tank sizes from 38 inches to 138 inches in diameter. If a different range is desired, this can easily be adapted by the computer software.

Next, the product switch 152, which is a 6-position binary rotary switch for selecting the type of product used, is set by the operator. At this time no action is taken concerning the API gravity switch 150 and the API temperature switch 151, since these switches are only set in Phase 2. However, the tank type switch 149, which is a 3-position toggle switch, must be set to indicate whether the tank is steel, fiberglass, or a combination of steel and fiberglass.

There is also provided for the convenience of the operator, an advance key 168, which the operator may use to advance the paper in the printer, a printer on/off key 169, which, when pressed, enables the printer 161 and an indicator light comes on. When the on/off key 169 is pressed the second time it disables the printer 161, and turns the indicator light off, and the advance key 168 is enabled.

There is also a resume key 170 connected to the human interface logic 108, which is a multi-function key that can be used to force the microcontroller 100 to perform some special tasks. At the end of any test phase the computer prints the message "END OF PHASE # . . . SWITCH TO PHASE # . . . ". If at this time the resume key 170 is pressed, it overrides the normal sequence and extends the time of the previous phase for 15 minutes.

If, during normal operation, the resume key 170 is pressed, it causes a series of alternating short and long beeps to be generated, and then the printer 161 prints all updated information concerning the present condition of the test phase. If, however, the resume key 170 is released coincidentally during the long series of beeps, the printer 161 prints out only the temperature of the product in degrees Fahrenheit.

Also, if during normal operation, the test phase switch 120 is turned to another phase, the computer prints "PHASE # . . . NOT COMPLETED". Pressing the resume key 170 at this moment puts the computer in a stand-by mode with a print out "ARE YOU SURE?". Pressing and holding the resume key 170, once again, up to the last warning beep, permits the computer to start that newly selected test phase.

The resume key 170 can also be used to print very accurately, up to 6 digits after the decimal point, the product volume pumped in or out of the standtube 61 in 5 minute intervals, as well as the temperature change and net change in the product volume.

Figure 13A:
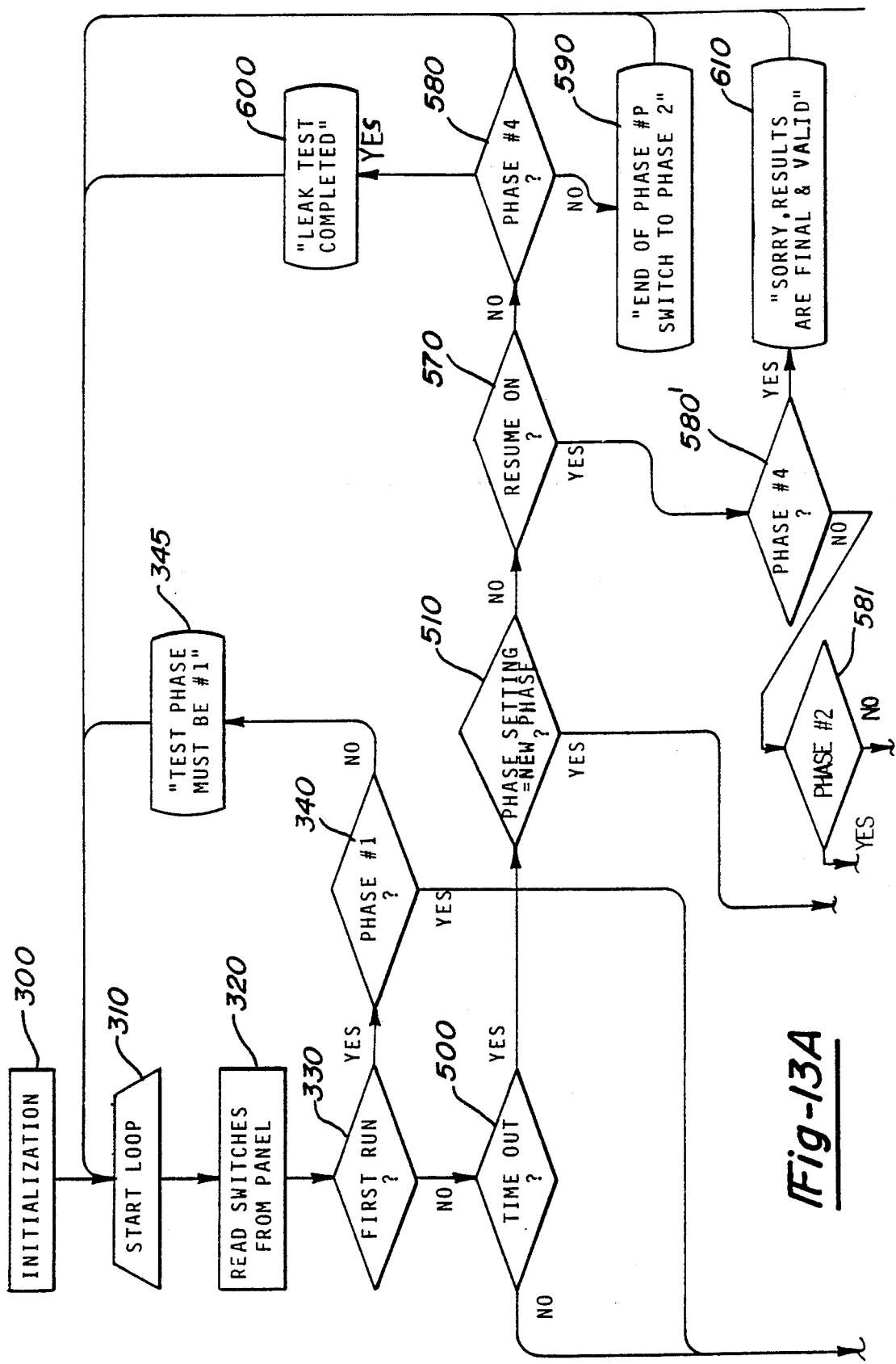
FIG. 13A is a flow chart showing a portion of the steps used in the method of operation of the present invention.
Figure 13B:
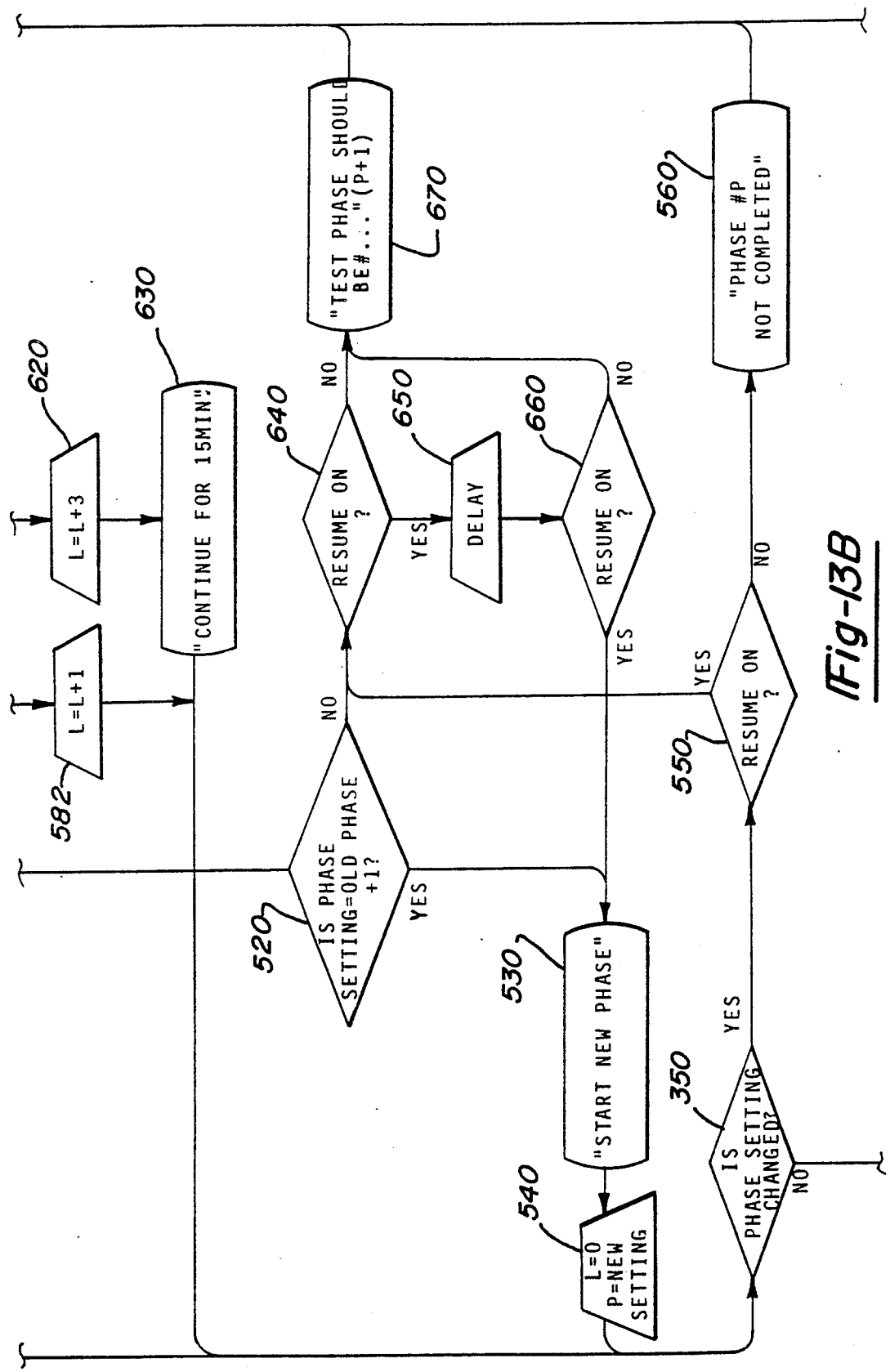
FIG. 13B is a flow chart showing more of the steps used in the method of operation of the present invention.
Figure 13C:
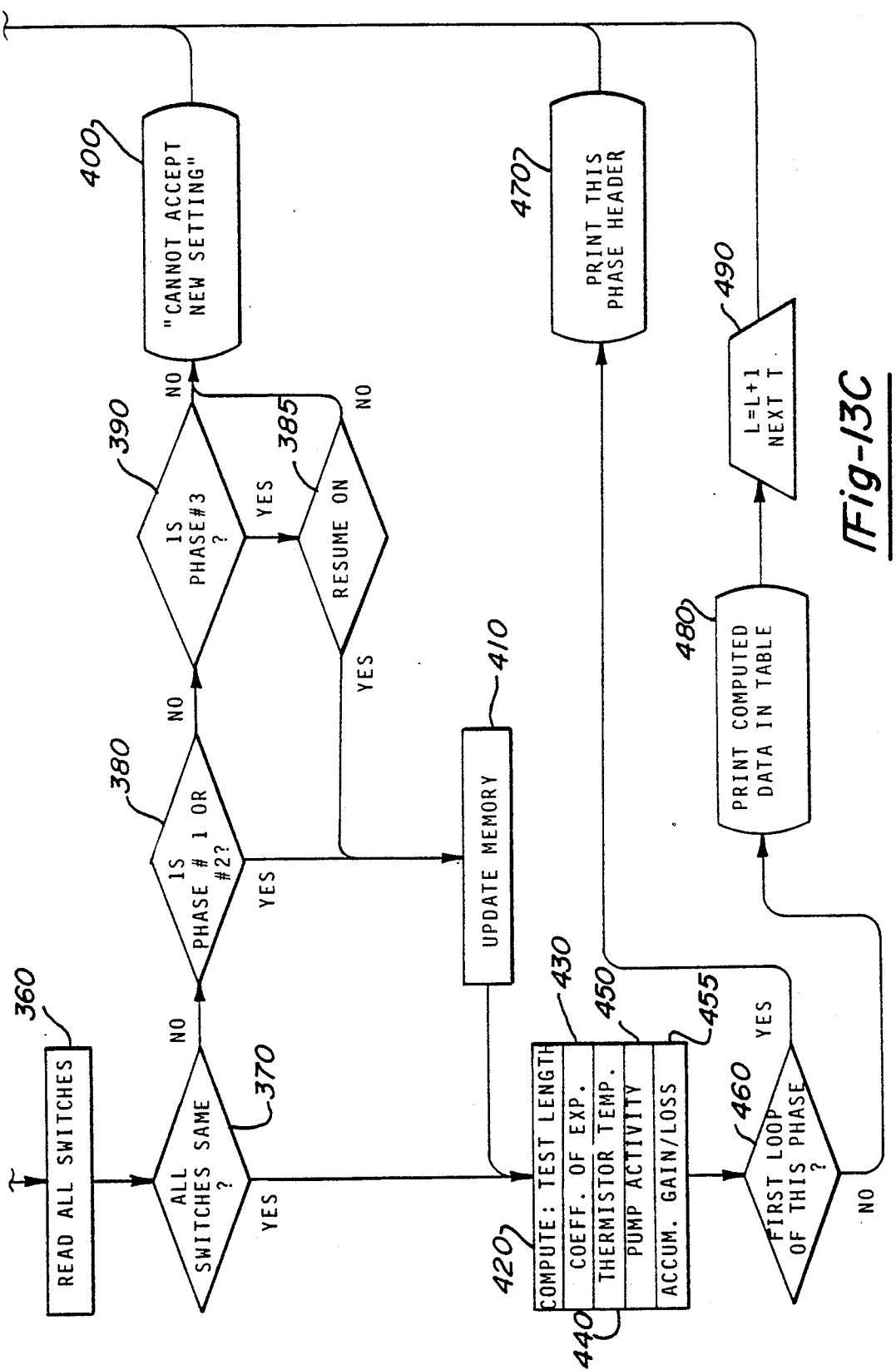
FIG. 13C is a flow chart showing still more of the steps used in the method of operation of the present invention.

To understand the method by which all of these operations take place, reference is made to the flow charts shown in FIGS. 13A–C. At the power up condition, the system controller 76 is initialized (Box 300) and the system enters the start loop at Box 310.

At this time, the computer program will cause the microcontroller 100 to read all of the settings previously entered on the tank capacity thumbwheel switch 142, the tank diameter switch 148, the tank type switch 149, the API gravity switch 150, the API temperature switch 151, the product type switch 152, and the test phase rotary switch 120.

The question is next asked (Box 330) is this the first time the computer has been through this loop in this phase or, in other words, does "L=1?". If the answer to this question is yes, the program proceeds to Box 340, and the question is asked "Is the test phase #1?" If the test phase is not number 1, the system controller 76 causes the printer 161 to print out the message shown in Box 345.

If the question in Box 340 is answered in the affirmative, in other words, the test phase is number 1, the system proceeds to Box 350 (FIG. 13B) and the question "Is phase setting changed ?" is asked. Since the phase switch 120 was set in Phase 1, and we are in Phase 1, the answer is in the negative, and the program will then proceed to Box 360 (FIG. 13C). The system controller 76 will again cause all the switches to be read again (Box 360), and in Box 370 the question is asked "Are all switches the same?". If there has been a change in the switch settings between Box 320 (FIG. 13A) and Box 370, the system controller 76 will then cause the question to be asked "Is the system in Phase 1 or 2 (Box 380)?" If the system is in Phase 1 or 2, the memory is updated (Box 410). The system makes the same decision if there were no changes in the switch setting (Box 360) when it was checked whether all the switch settings were the same in Box 370.

At Box 380, if the system was not in Phase 1 or 2, the question is asked "Is the test Phase number 3?" (Box 390). If it is not, the system will not accept the new setting (Box 400) and will loop to Box 310 (FIG. 13A). If the system was in Phase 3, the question is asked "Is the resume function on?" If the resume function is not on, again the system will not accept the new setting (Box 400), and will loop to Box 310. If the resume function was on, the system will update memory (Box 410) and proceed to Box 420.

In Boxes 420, 430, 440 and 450, which will be explained in more detail hereinafter, the system causes the enable relay 110 (FIG. 7) to be opened, sending a signal to the 17-bit analog-to-digital converter 99 to cause it to read the thermistor voltage, after which it closes the enable relay 110, reads the voltage from the analog-to-digital converter 99, and computes the thermistor temperature, as well as computing the coefficient of expansion of the fluid in the tank 52, the fluid pumped into and out of the standtube 61 by the metering pump 72, and prints out an indication of the accumulated gain or loss of fluid in the standtube 61. After all these computations are performed the system proceeds to Box 460 where the question is again asked "Is this the first loop of this phase?", or in other words, does "L=1?" If it does, the system will proceed to Box 470, print a phase header, and again return to loop 310 (FIG. 13A). If it is not the first loop of the phase, the computer will proceed to Box 480 and cause the data computed for the particular loop that the system is in to be printed in a table.

To prepare the system for the next loop a counter is set at Box 490, such that L=L+1, or in other words, L will now=2. The system then returns to Box 310 to start the next loop, proceeds to Box 320 where all the switches are read, and then to Box 330 where the question is asked "Is this the first run of the loop?" Since the answer is now no, the system then proceeds to Box 500 and asks "Has the time for the test computed in Box 420 expired?". If it has not, the system then proceeds to Box 350 for a phase check, in other words, "Is phase setting changed?" Since it has not, the steps described hereinabove for Boxes 360 through 390 would again be performed, if necessary, and the loop would continue until at Box 500 the question "Time out?" would be answered yes.

At Box 510, the system should proceed to Phase 2, but the old phase is equal to 1, so that "phase sitting" does not equal "new phase". The computer will then proceed to Box 570 to check if the resume key is on. Since the resume key is not on, in Box 580 the system asks "Is test Phase 4?", and since it is not in Phase 4, it proceeds to Box 590 and prints a header for the operator to read which says "END OF PHASE 1-SWITCH TO PHASE 2", then it proceeds to the start loop and waits for the operator to make the necessary change. The message in the header may be accompanied by warning signs, such as a series of beeps, or a buzzer, to instruct the operator to change the phase switch. Once the operator changes the phase switch, the system will proceed through the start loop (Box 310) to the read data Box 320 and ask if this is the first run? Since it is not, the question in Box 330 would be answered "No", and in essence the system would again proceed to Box 350 and continue to cycle until Phase 2 is completed, in which case the "time out" question in Box 500 would be answered in the affirmative.

The same considerations just discussed concerning Boxes 510 through 590 would be considered. The system would enter and complete Phase 3 by the means just described until the time out in Box 500 would be completed. The questions in Boxes 510 through 590 would again be considered, and the system would enter Phase 4 and continue through all the loops just described until the time out in Box 500 would be answered in the affirmative, at which time the system would proceed to Box 510, at which time the computer would consider the old Phase 4 not equal to the new Phase 1, and would check if the resume key 170 is pressed, which it would not be (Box 570), it would ask whether the system is in Phase 4 (Box 580), and since it was, it would print the message "LEAK TEST COMPLETE" (Box 600).

At this time a complete operation of the system has been described, except for the special conditions concerning the resume key 170, which can be used in several circumstances. One place the resume key 170 is of particular advantage is if the operator wishes to, for some reason, extend the length of any phase. The length of any phase, except Phase 4, can be extended by a set period of 15 minutes, or 3 loops through the system, by pressing the resume key 170 at the end of the normal time out. In this case, when the "time out" question is answered in the affirmative at Box 500, and the system goes to Box 510, and the operator has not yet switched the phase switch 120 to a new phase, such that the old phase does not equal the new phase, when the "resume on" question is asked in Box 570, and the operator has pressed the resume key 170, the question is answered in the affirmative. The system next proceeds to Box 580 and asks if the system is in Phase 4. Since, as noted above, the resume key is not recognized in Phase 4, the resume key question would be answered "No", unless the operator did try to push the resume key 170 in Phase 4, in which case Box 610 would cause the printer to print the heading "SORRY, RESULTS ARE FINAL AND VALID" and exit from the system to the beginning of the start loop.

However, assuming that the operator does not err, and does not push the resume key 170 in Phase 4, the system will proceed to Box 620 where the loop counter will be advanced by 3. Since for the purposes of illustration of the present system, we have assumed that a reading of the thermistor is taken every 5 minutes, so that one loop is performed every 5 minutes, it can be seen that adding 3 to the loop counter adds 15 minutes to the test. It is well within the scope of the present invention however, depending upon the particular application, that a loop may be performed more frequently or less frequently than every 5 minutes.

Once 3 is added to the number of loops, the header "CONTINUE FOR 15 MINUTES" (Box 630) (FIG. 13B) is printed and the system then advances to Box 350 to continue going through the loop 3 more times. The operator also has the choice, rather then waiting till the end of any phase, to advance it during the phase if the need for such advancement becomes evident. Before, in the description of Box 550, it was assumed that the resume key 170 was not pressed. For the purposes of illustration, assume that it is pressed. In this case, the system will follow a different path to Box 640. There is now an interval test wherein the operator must hold the resume key 170 depressed for a certain amount of time, so that the system is sure that the operator wants to advance the test, and that someone just did not accidentally hit the advance key 168. Therefore, there is a built in delay during which a series of beeps are emitted (Box 650), and then at Box 660 it is again asked if the resume is on. If the resume is on, the system progresses from Box 660 to Box 530 where the printer 161 prints out the heading "START NEW PHASE". The loop counter is reset to zero, and the phase counter is advanced by 1, so that the operator then successfully has changed the phase, rather than waiting until the end of the test.

If however, the resume key 170 was accidently bumped and not held down by the operator during the delay time (Box 650), the resume question in Box 660 would be answered in the negative, and the system would advance to Box 670, where the warning message "TEST PHASE SHOULD BE # ..." (P+1) would be printed to indicate to the operator that because the resume key 170 was pressed, he should have changed the phase switch 120 during the delay time (Box 650). The test would then go back to immediately before the start loop (Box 310) and continue through the old phase unless the operator changes the phase switch 120, in which case, as previously described, a new phase would be started.

To understand how the computations of test length, coefficient of expansion, temperature of the fluid, and the volume pumped in or out of the tank, indicated in Boxes 420-450, are computed, reference is made to FIGS. 14A-14D. While the computations are shown being made in the order of test length, coefficient of expansion, temperature of fluid and volume of fluid pumped in or out of the standtube 61, it is not necessary to compute these values in this order, and since the computations are substantially instantaneous, they can be calculated in any order and be within the scope of the claims.

Figure 14A:
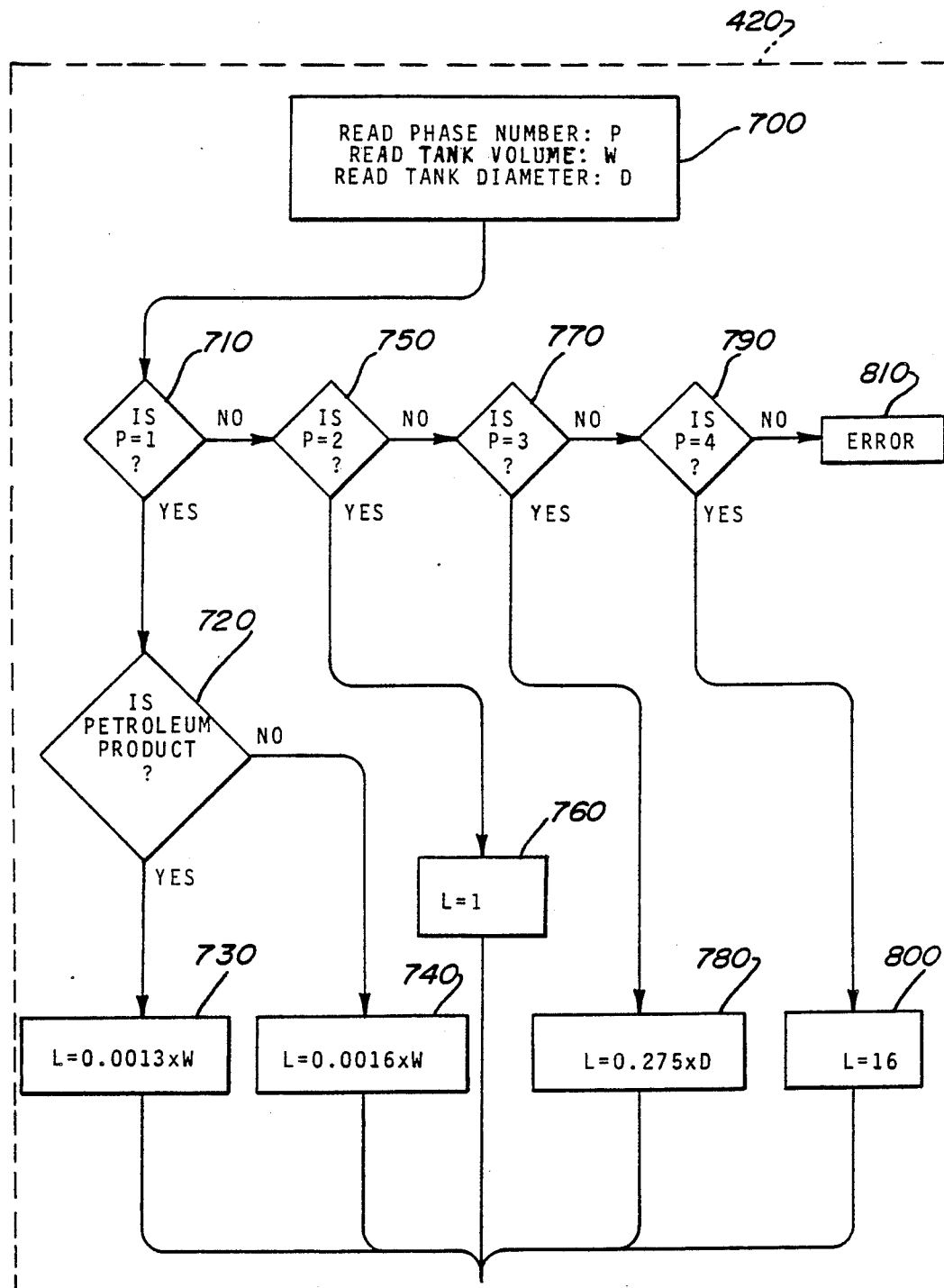
FIGS. 14A-14D comprise a flow chart showing in more detail the steps necessary to compute the coefficient of expansion, the thermistor temperature, the pump activity and the accumulated gain or loss of fluid being measured in the system.

Referring first to FIG. 14A, the steps of computing the test time are set forth therein in detail. The system first reads the setting "P" on the phase switch 120. It next reads the tank volume "W" on the tank volume switch 142. The tank volume variable is indicated as "W" for purposes of illustration, so it will not be confused with the variable "V", sometimes used for voltage, hereinafter. Next the system reads the tank diameter (D) off the tank diameter switch 148 (Box 700). The question is next asked (Box 710) "Is the system in the first phase?" or "Is P=1?" (Box 710).

Assuming that the test is in Phase 1, the question is asked (Box 720) "Is a petroleum product in the tank?". If a petroleum product is in the tank, the length of the test (in number of loops) is computed according to the following formula, "Length=0.0013×tank volume". If Box 720 indicates that a petroleum product is not in the tank, i.e.: the product type switch 152 is set at some other setting other than a petroleum product, the test is computed accorded to the following formula, "L or length of test (in number of loops)=0.0016×volume. As can be seen, the length of the test for a non-petroleum product is slightly longer i.e.: the test will run through slightly more loops then it does for a petroleum product. This is because it has been determined by experimentation that it takes a longer time of circulation to have the contents of the tank arrive at a stabilized temperature when the fluid in the tank is a non-petroleum product, than it does when it is a petroleum product. Of course, since the present tank tightness tester can be used for testing all types of tanks, these formulas may need to be changed if a fluid having a different specific gravity from those contemplated is found in the tank to be tested.

Phase 2 of the test is merely concerned with giving the operator sufficient time to determine the API specific gravity and the API volume by manual means, using API (American Petroleum Institute) approved devices. Thus, if Box 710 which asks "Is the phase=1?" answers that question negatively, but Box 750 which asks the question "Is the phase=2?", answers in the affirmative, L will be set equal to 1 at Box 760 regardless of the type of the product, giving the operator 5 minutes to measure and enter the API specific gravity and the API temperature. If the operator needs more time to measure the API temperature and gravity, he can press the resume key 170 and extend the time by 5 minutes, by the method indicated at Boxes 581 and 582.

Since Phase 3 of the test is concerned with the stabilization of the tank deflection, rather than the change in temperature of the fluid within the tank, the length of the test is dependent on the tank diameter rather than on the fluid in the tank. Thus, if the system advances past Box 710 and Box 750 to Box 770, and the question "Is phase=3?" is answered in the affirmative, the system will advance to Box 780 and compute the length of the test (in number of loops) according to the following formula: "Number of loops=0.75×tank diameter (inches)". If the system is in Phase 4 at Box 790, the question "Is phase=4?" will be answered in the affirmative, and at Box 800, the length of the test (in number of loops), will be set equal to 16 loops, representative of 80 minutes of test. This 80 minutes include a 20 minute stabilization time, when the level in the stand-tube 61 is lowered from 42 inches to 12 inches, and then a 1 hour test. This amount of time has been determined arbitrarily as the desired length of test, but may be changed depending upon the products tested, or by experimentation.

If for some reason, the system progresses through Boxes 710, 750 and 770, but the question "Is phase=4?" in Box 790 is answered No, an error message is printed (Box 810).

Figure 14B:
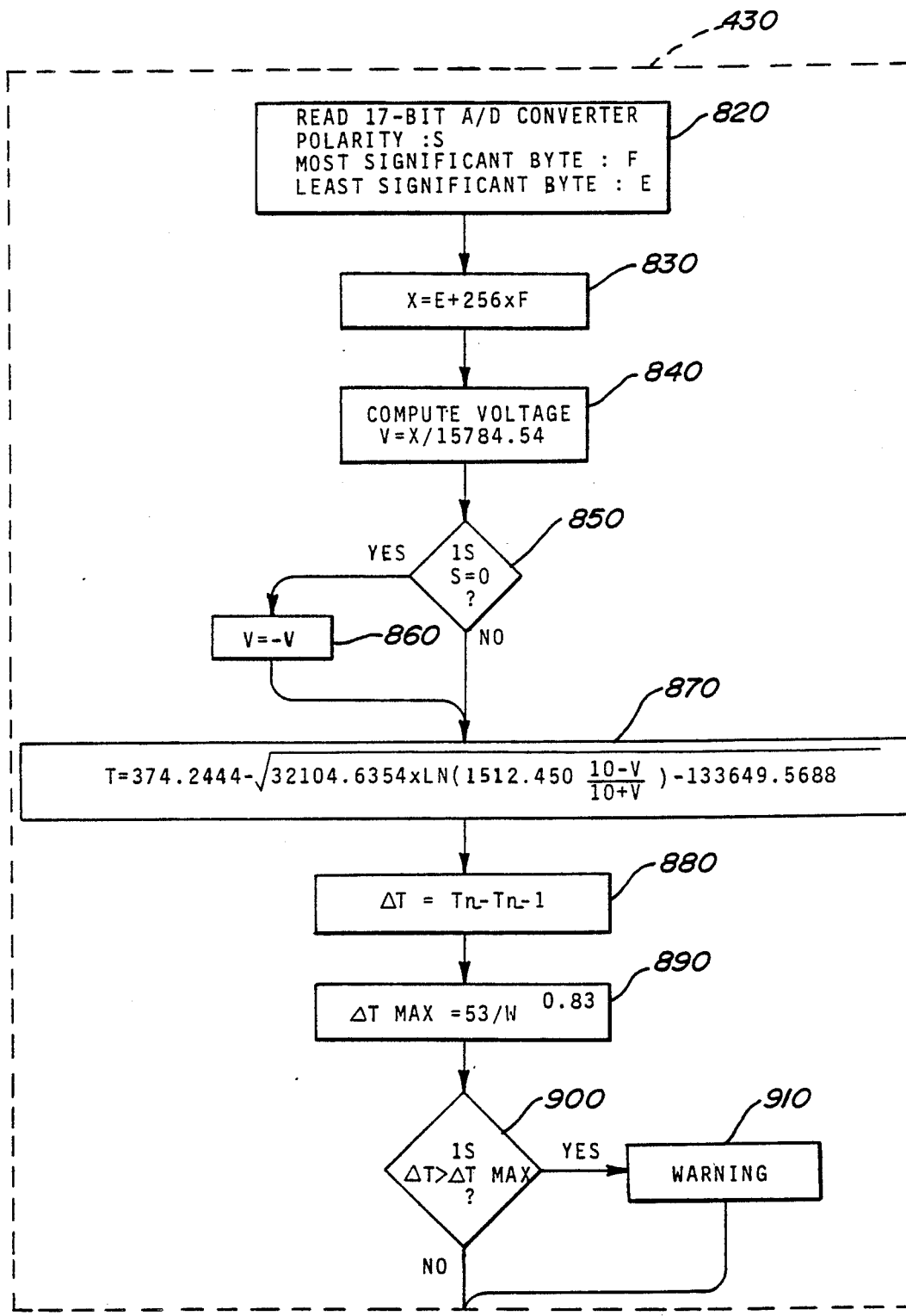

Once the length of the particular phase of the test which is occurring is calculated, the system must calculate the instantaneous value of the temperature (Box 430). Referring to FIG. 14B, the importance of having a 17-bit analog-to-digital converter 99 to obtain the necessary accuracy in the system has previously been explained. The 17-bit analog-to-digital converter 99 uses one of its bits for a polarity sign, so the system at Box 820 is reading a polarity sign and 16 bits. In so doing it determines the value "S" which will represent the polarity, reads the most significant byte which will represent the value of "F", and also reads the least significant byte "E". It then calculates the value of the variable X (Box 830) according to the formula $X = E + (256 \times F)$.

The next step (Box 840) is to compute the voltage according to the formula "V=X divided by 15784.54". This formula results from the characteristics of the analog-to-digital converter 99. The system next checks on the polarity of the reading (Box 850). If the polarity signal is equal to zero, V is set equal $-V$, while if the polarity sign is not zero, the system proceeds directly to the calculation of temperature as set forth in Box 870. The formula set forth in Box 870 has been determined as an approximation of the thermistor characteristics of resistance versus temperature for the particular thermistor being used in this system, which is model No. 3R1508 thermistor manufactured by Midwest Components, Inc. of Muskegon, Mich. If a different thermistor is being used a different formula will have to be determined. However, the particular thermistor being used in the present system is one that has been used in the art for a number of years and whose characteristics are very well known.

Next, the change in temperature or "Delta T" is calculated according to the formula set forth in Box 880. This is the change in temperature from the previous reading to the present reading.

Next, an error analysis is performed to determine if the maximum temperature change under the particular test conditions is such that it will not affect the final result. For example, errors in the present system are known to occur from various factors, such as an error in the tank capacity, an error in determining the coefficient of expansion, and errors due to the thermistor characteristics. If for example, there are errors of plus or minus 2% in every valve read, due to the errors built into the various values used in the calculations, the volume change per degree of temperature change for a particular tank is calculated with all errors assumed to be on the minus side, and then recalculated with all errors assumed to be on the plus side, these two values are then subtracted, and the amount of change in temperature needed to produce this volume change is Delta T max. This value of temperature change, under a particular set of conditions, could make a tight tank in actuality be rejected as a leaky tank, and the change in temperature from one reading to another should not exceed this value. A number has been calculated by experimentation from approximately 1,000 field tests such that the change in temperature allowed due to accumulated errors in the system is equal to 53 divided by (the volume of the tank raised to the power of 0.83. The system calculates this Delta T max in Box 890, and in Box 900 calculates whether the change in temperature from the last reading to the present reading is greater than Delta T max. If it is not, the system will proceed to calculate the volume of the fluid in or out of the system. If the change in temperature is greater than the Delta T max, a warning is given to the operator (Box 910).

Figure 14C:
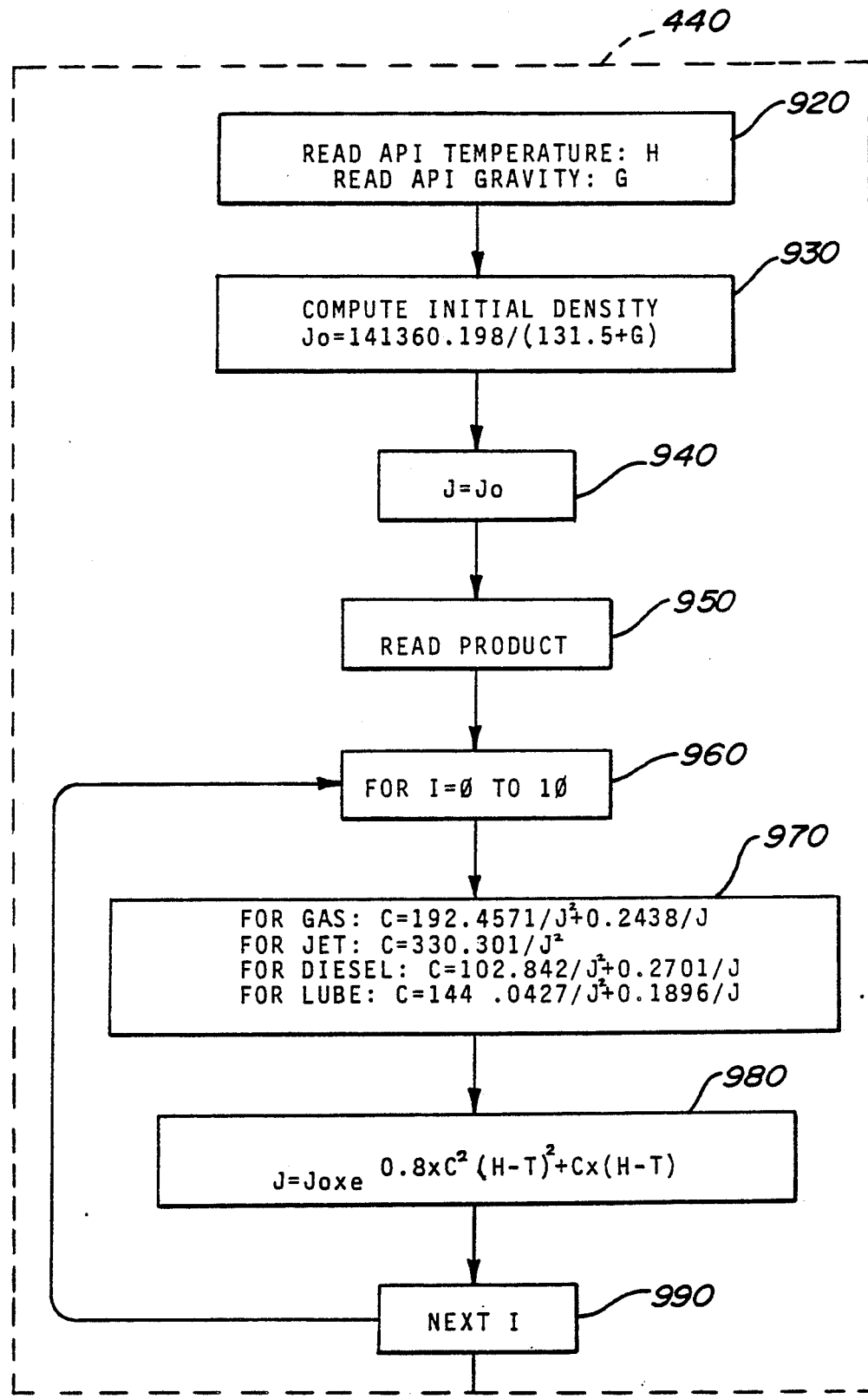
Figure 14D:
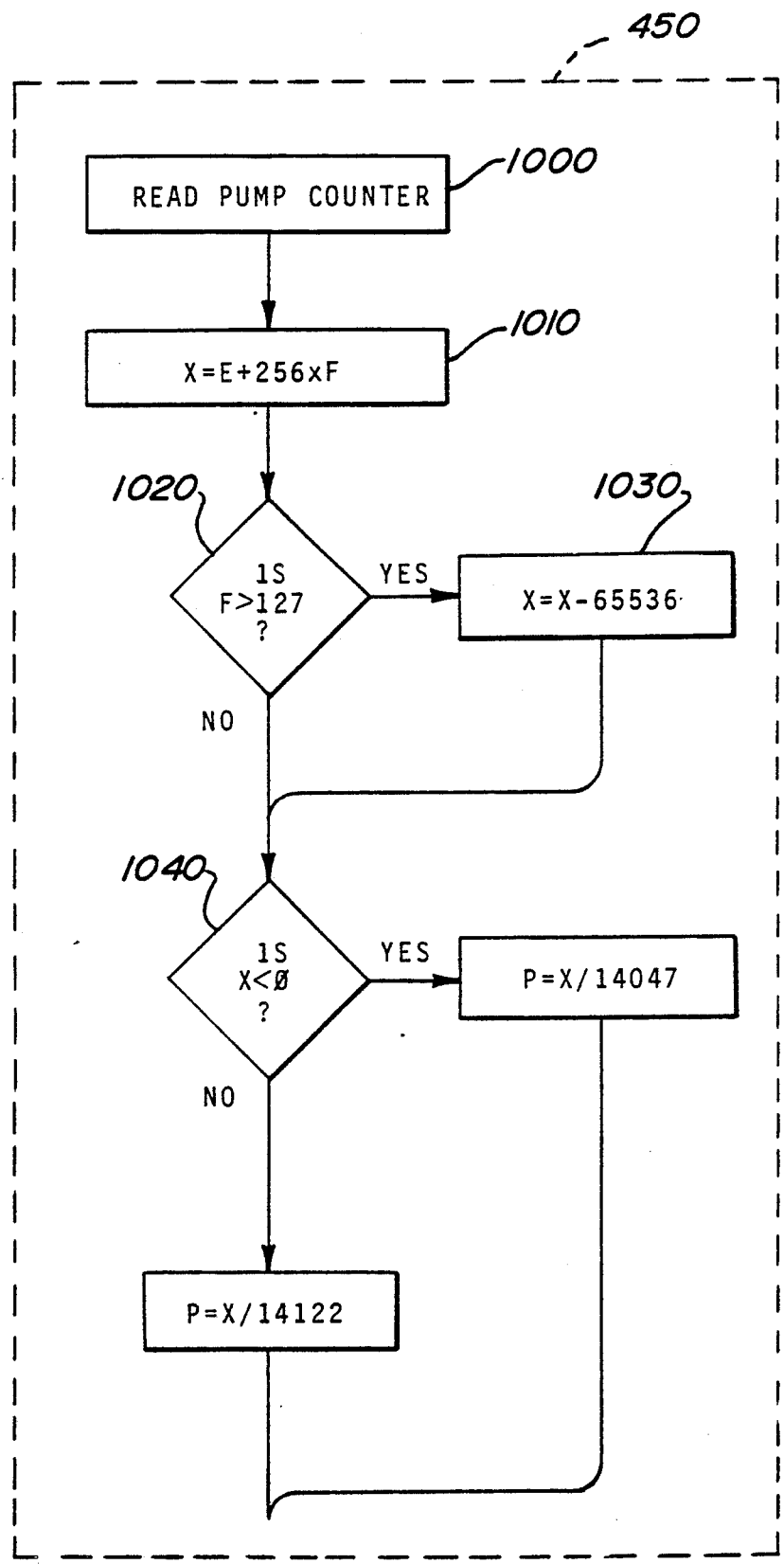

Presuming that the change in temperature is not greater than Delta T max, the system that proceeds to calculate the coefficient of expansion as indicated in Box 440 (FIG. 14C).

In calculating the coefficient of expansion (Box 440) the system of the present invention follows the method set forth in the "Manual of Petroleum Measurement Standards", and more particularly Chapter 11.1 thereof entitled "Volume Correction Factors", which explain the American Petroleum Institutes' standard No. 2540 as published in the first edition in August of 1980. Copies of this publication are available from the American Petroleum Institute, 2101 L Street N.W., Washington, D.C. 20037.

In determining the coefficient of expansion, it will be understood that in Phase 2 of the test the operator has taken a sample of the fluid being circulated using instruments calibrated in API temperature and API gravity, according to the aforementioned publication. The API temperature entered on the API temperature switch 151 is set equal to the value of "H", and the value of the API gravity entered on the API gravity switch 150 is set equal to the value of "G" (Box 920). Then at Box 930 the system calculates an initial density value $J_0$ according to the aforementioned publication. At Box 940, the new variable J is set equal to $J_0$ and the system reads the product type at Box 950. It then goes through the loop indicated at Boxes 960–990, for I equal 0 to 10 using the constants indicated in Box 970 for the various products which may be set on the product type switch 152, and then calculates the coefficient of expansion according to the formula set forth in Box 980. This interation method is necessary because the coefficient of expansion should actually be measured from one temperature to another to actually measure the coefficient of expansion of the fluid in the tank. However, this is not possible to do under field conditions, and the method defined in the aforementioned publication is a way to approximate the actual coefficient of expansion by the use of certain assumptions and formulas. After going through the loop for 10 readings, the final J value is used as the coefficient of expansion.

The system next proceeds to Box 450 (FIG. 14D) to determine the volume of the fluid pumped into or out of the tank during the particular loop which the system is in. To calculate the volume of fluid pumped into or out of the standtube 61, which represents the volume of the fluid pumped into or out of the tank, the system first reads the pump counter 147 (Box 1000). Since this is a 16-bit pump counter, the range of the counter 147 for the purposes of the present system is divided into two parts to determine if the number of revolutions is positive or negative. If the value of the most significant byte "F" is greater than 127, then the direction is negative. If the value of the most significant byte "F" is less than 127, it is positive. Thus, the pump counter is read at Box 1000, and a variable X is then calculated at Box 1010, again using the least significant and most significant byte of the pump counter 147, similar to that which was used with the 17-bit analog-to-digital converter 99. After the value of X is calculated, the value of "F" is checked, which, as mentioned immediately above, determines the direction of rotation. If F is greater than 127 (Box 1020) then a new value of X is set to equal X minus 65536 (Box 1030). If X is not greater than 127, the question is asked (Box 1040) "Is X less than zero?" Because the pump 72 does not pump exactly the same volume in one direction as in the other, the value in gallons which must be determined will be slightly different if the pump is rotated in a clockwise direction or a counter clockwise direction. If X is less than zero, to get the number of gallons pumped, which in this example is the variable "P", X will be divided by 14,047. If X is not less than zero, X will be divided by 14,122. Once the value in gallons is obtained the step of determining the pump activity is completed, and all the calculation steps shown in Boxes 420–450 of FIG. 13A have been calculated.

At this point, the data can be used for the print out shown in Box 480 (FIG. 13C), in which, depending on the phase, and by means well known in the art, the amount of product pumped in or out from one loop to the next loop can be printed, as well as the temperature change, the volume change, the net volume change, and the accumulated volume (Box 455). In the preferred embodiment, the accumulated volume or estimated leak is only printed out during Phase 4, which is the actual test for leakage after the other phases are used to stabilize conditions. The accumulated volume is calculated by summing the net change in volume occurring during each loop in Phase 4. The net change in volume for any particular loop is obtained by subtracting from the volume of product pumped in or out, the volume change due to temperature change.

For the operator's information, information on the test phase, the time to end of test, the observed API gravity, the observed API temperature, the tank capacity, the tank diameter, the tank type, the selected product, the calculated coefficient of expansion, the calculated volume change factor, the temperature change factor, the aforementioned system error factor, and the product temperature at the beginning one or more of the phases of the test may also be printed.

Thus, by carefully analyzing previous tank tightness measurement systems, and determining that only by instantaneously replacing any fluid, lost due to leakage or temperature factors, to keep the tank in an equilibrium condition, could a truly accurate system be provided, and by providing a method and apparatus to accomplish this, a novel and much more accurate tank tightness test system than was ever available before is provided.

What is claimed is:

1. A level sensor for maintaining the level of fluid in a vertical level sensing tube comprising:
   (a) a dual coil bobbin mounted on the level sensing tube having an upper portion and a lower portion;
   (b) an upper sensor coil winding having a pair of leads mounted on the upper portion of said dual coil bobbin;
   (c) a lower sensor coil winding having a pair of leads mounted on the lower portion of said dual coil bobbin;
   (d) a shield mounted around said dual coil bobbin;
   (e) a non-magnetic bracket mounted in the level sensing tube;
   (f) said non-magnetic bracket having an upper end disposed above the fluid level in the level sensing tube, and a lower end disposed below the fluid level in the level sensing tube;
   (g) a monofilament line mounted in tension between said non-magnetic bracket upper and lower ends;
   (h) a float, made from a non-absorbent material, having an axial opening therethrough for the slidable reception and mounting of the float on the monofilament line;
   (i) a ferromagnetic ring mounted about the circumference of the float;
   (j) an insulator block mounted on said shield;
   (k) an electrical connector member mounted on the insulator block and having an upper contact connected to one lead from the upper sensor coil winding, a lower contact connected to one lead from the lower sensor coil winding, and a center contact connected to the other lead of each of the sensor coil windings;
   (l) the upper, lower and center contacts are adapted to be connected to a source of electrical energy during use to energize the coil windings;
   (m) the ferromagnetic ring is disposed about the circumference of the float at an exact center set point position between the upper and lower sensor coil windings when the fluid in the level sensing tube is at an exact selected level, whereby if the fluid level in the level sensing tube rises above said set point position of the ferromagnetic ring, the float and the ferromagnetic ring will move upwardly above the set point position into the upper sensor coil winding and a signal will be induced in the upper sensor coil winding and sent to a fluid level transfer means to transfer fluid out of the level sensing tube to cause the float and ferromagnetic ring to move down and return to the set point position, and if the fluid level in the level sensing tube falls below said set point position of the ferromagnetic ring, the float and the ferromagnetic ring will move below the set point position into the lower sensor coil winding and a signal will be induced in the lower sensor coil winding and sent to the fluid transfer means to transfer fluid into the level sensing tube to cause the float and the ferromagnetic ring to move up and return to the set point position.

2. A fluid level sensor for maintaining the level of fluid in a vertical fluid level sensing tube as defined in claim 1, wherein:
   (a) said axial opening in said float is lined with a low friction lining.

* * * * *